United States Patent
Li et al.

(10) Patent No.: US 10,503,409 B2
(45) Date of Patent: Dec. 10, 2019

(54) LOW-LATENCY LIGHTWEIGHT DISTRIBUTED STORAGE SYSTEM

(71) Applicant: Alibaba Group Holding Limited, George Town, Grand Cayman (KY)

(72) Inventors: Shu Li, Bothell, WA (US); Ming Lin, San Jose, CA (US)

(73) Assignee: Alibaba Group Holding Limited, George Town (KY)

( * ) Notice: Subject to any disclaimer, the term of this patent is extended or adjusted under 35 U.S.C. 154(b) by 142 days.

(21) Appl. No.: 15/717,667

(22) Filed: Sep. 27, 2017

(65) Prior Publication Data

US 2019/0095106 A1    Mar. 28, 2019

(51) Int. Cl.
| | |
|---|---|
| *G06F 13/00* | (2006.01) |
| *G06F 3/06* | (2006.01) |
| *G06F 15/173* | (2006.01) |
| *G06F 12/1018* | (2016.01) |

(52) U.S. Cl.
CPC ............ *G06F 3/0611* (2013.01); *G06F 3/067* (2013.01); *G06F 3/0635* (2013.01); *G06F 3/0643* (2013.01); *G06F 3/0653* (2013.01); *G06F 3/0665* (2013.01); *G06F 3/0689* (2013.01);
(Continued)

(58) Field of Classification Search
CPC ............... G06F 3/067; G06F 15/17331; G06F 12/1018; G06F 3/0689; G06F 3/0665; G06F 3/0653; G06F 3/0635; G06F 3/0611
See application file for complete search history.

(56) References Cited

U.S. PATENT DOCUMENTS

| | | |
|---|---|---|
| 4,775,932 A | 10/1988 | Oxley |
| 6,226,650 B1 | 5/2001 | Mahajan et al. |

(Continued)

FOREIGN PATENT DOCUMENTS

| | | |
|---|---|---|
| JP | 2003022209 | 1/2003 |
| JP | 2011175422 | 9/2011 |
| WO | 1994018634 | 8/1994 |

OTHER PUBLICATIONS https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).

(Continued)

*Primary Examiner* — Charles Rones
*Assistant Examiner* — Han V Doan
(74) *Attorney, Agent, or Firm* — Shun Yao; Park, Vaughan, Fleming & Dowler LLP

(57) ABSTRACT

Embodiments described herein provide a system for facilitating a lightweight distributed storage system. During operation, the system generates a data segment from a data file associated with a write operation and determines a storage key for the data segment. The storage key indicates a calculated storage path associated with a replica of the data segment. The system then determines whether a user-defined storage path is specified by a user for the data segment. If a user-defined storage path has not been specified by the user for the data segment, the system generates a data packet comprising the data segment, wherein a destination for the data packet corresponds to a target disk specified by the calculated storage path.

20 Claims, 16 Drawing Sheets

(52) U.S. Cl.
CPC .... *G06F 12/1018* (2013.01); *G06F 15/17331* (2013.01)

(56) References Cited

U.S. PATENT DOCUMENTS

| | | | |
|---|---|---|---|
| 6,243,795 B1* | 6/2001 | Yang | G06F 11/1666 160/113 |
| 7,565,454 B2 | 7/2009 | Zuberi | |
| 8,260,924 B2 | 9/2012 | Koretz | |
| 8,452,819 B1 | 5/2013 | Sorenson, III | |
| 8,516,284 B2 | 8/2013 | Chan | |
| 8,949,208 B1* | 2/2015 | Xu | G06F 3/0641 707/661 |
| 9,043,545 B2 | 5/2015 | Kimmel | |
| 9,092,223 B1 | 7/2015 | Pani | |
| 9,588,698 B1 | 3/2017 | Karamcheti | |
| 9,588,977 B1 | 3/2017 | Wang | |
| 2002/0010783 A1 | 1/2002 | Primak | |
| 2002/0161890 A1 | 10/2002 | Chen | |
| 2004/0010545 A1 | 1/2004 | Pandya | |
| 2004/0255171 A1 | 12/2004 | Zimmer | |
| 2004/0268278 A1 | 12/2004 | Hoberman | |
| 2005/0038954 A1 | 2/2005 | Saliba | |
| 2005/0097126 A1 | 5/2005 | Cabrera | |
| 2005/0177755 A1 | 8/2005 | Fung | |
| 2005/0195635 A1 | 9/2005 | Conley | |
| 2005/0235171 A1 | 10/2005 | Igari | |
| 2006/0156012 A1 | 7/2006 | Beeson | |
| 2007/0033323 A1 | 2/2007 | Gorobets | |
| 2009/0282275 A1 | 11/2009 | Yermalayeu | |
| 2009/0307249 A1 | 12/2009 | Koifman | |
| 2010/0031000 A1* | 2/2010 | Flynn | G06F 16/9014 711/216 |
| 2010/0229224 A1 | 9/2010 | Etchegoyen | |
| 2010/0325367 A1 | 12/2010 | Kornegay | |
| 2011/0055458 A1 | 3/2011 | Kuehne | |
| 2011/0153903 A1 | 6/2011 | Hinkle | |
| 2011/0218969 A1 | 9/2011 | Anglin | |
| 2011/0231598 A1 | 9/2011 | Hatsuda | |
| 2011/0292538 A1 | 12/2011 | Haga | |
| 2011/0302353 A1 | 12/2011 | Confalonieri | |
| 2012/0084523 A1 | 4/2012 | Littlefield | |
| 2012/0117399 A1 | 5/2012 | Chan | |
| 2012/0210095 A1 | 8/2012 | Nellans | |
| 2012/0246392 A1 | 9/2012 | Cheon | |
| 2013/0013880 A1* | 1/2013 | Tashiro | H03M 7/30 711/170 |
| 2013/0073798 A1 | 3/2013 | Kang | |
| 2013/0145085 A1 | 6/2013 | Yu | |
| 2013/0145089 A1 | 6/2013 | Eleftheriou | |
| 2013/0159251 A1 | 6/2013 | Skrenta | |
| 2013/0159723 A1* | 6/2013 | Brandt | G06F 21/6218 713/176 |
| 2013/0166820 A1 | 6/2013 | Batwara | |
| 2013/0173845 A1 | 7/2013 | Aslam | |
| 2013/0219131 A1 | 8/2013 | Alexandron | |
| 2013/0318283 A1 | 11/2013 | Small | |
| 2014/0108414 A1 | 4/2014 | Stillerman | |
| 2014/0233950 A1 | 8/2014 | Luo | |
| 2014/0250259 A1 | 9/2014 | Ke | |
| 2014/0310574 A1 | 10/2014 | Yu | |
| 2014/0359229 A1 | 12/2014 | Cota-Robles | |
| 2014/0365253 A1 | 12/2014 | Talagala | |
| 2015/0019798 A1 | 1/2015 | Huang | |
| 2015/0082317 A1 | 3/2015 | You | |
| 2015/0106556 A1 | 4/2015 | Yu | |
| 2015/0142752 A1 | 5/2015 | Chennamsetty | |
| 2015/0372597 A1 | 12/2015 | Luo | |
| 2016/0098344 A1 | 4/2016 | Gorobets | |
| 2016/0110254 A1 | 4/2016 | Cronie | |
| 2016/0232103 A1 | 8/2016 | Schmisseur | |
| 2016/0239074 A1 | 8/2016 | Lee | |
| 2016/0239380 A1 | 8/2016 | Wideman | |
| 2016/0343429 A1 | 11/2016 | Nieuwejaar | |
| 2016/0350002 A1 | 12/2016 | Vergis | |
| 2017/0162235 A1 | 6/2017 | De | |
| 2017/0168986 A1 | 6/2017 | Sajeepa | |
| 2017/0212708 A1 | 7/2017 | Suhas | |
| 2017/0228157 A1 | 8/2017 | Yang | |
| 2017/0344470 A1 | 11/2017 | Yang | |
| 2017/0353576 A1 | 12/2017 | Guim Bernat | |
| 2018/0024772 A1 | 1/2018 | Madraswala | |
| 2018/0088867 A1 | 3/2018 | Kaminaga | |
| 2018/0349396 A1* | 12/2018 | Blagojevic | G06F 3/0659 |

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

EMC Powerpath Load Balancing and Failover Comparison with native MPIO operating system solutions. Feb. 2011.

\* cited by examiner

LOW-LATENCY LIGHTWEIGHT DISTRIBUTED STORAGE SYSTEM

BACKGROUND

Field

This disclosure is generally related to the field of data storage. More specifically, this disclosure is related to a system and method for facilitating a low-latency distributed storage system.

Related Art

The proliferation of the Internet and e-commerce continues to create a vast amount of digital content. Distributed storage systems have been created to access and store such digital content. A traditional distributed storage system is designed for handling a variety of scenarios. As a result, such storage systems can require extensive protocol stack, leading to complicated mechanisms for regular read or write operations. Many features of the storage system can be redundant and may not be necessary for regular day-to-day operations.

For example, to ensure integrity of the files, the storage system can maintain periodic snapshots of the storage devices (e.g., non-volatile storage disks). However, this feature can increase the number of operations supported by the storage system and cause the organization of data to become complicated. Typically, multiple replicas of a respective data file are stored in one or more storage devices, often on different storage servers. These replicas can provide high availability (e.g., failure recovery) to the data file. As a result, maintaining periodic snapshots can become a redundant feature.

In addition, a storage system typically relies on a master node for load balancing. If a client server needs to store a data file in a storage device, the client server sends a request to the master node. The master node can select one or more target storage devices for the data file in a load-balanced way and notify the client server about the selection. The client server then stores one or more replicas of the data file in the target storage devices. However, the master node can become a single point of failure and can increase the latency of the storage system.

While a distributed storage system brings many desirable features to efficient data storage, some issues remain unsolved in facilitating a simple, low-latency storage system.

SUMMARY

Embodiments described herein provide a system for facilitating a lightweight distributed storage system. During operation, the system generates a data segment from a data file associated with a write operation and determines a storage key for the data segment. The storage key indicates a calculated storage path associated with a replica of the data segment. The system then determines whether a user-defined storage path is specified by a user for the data segment. If a user-defined storage path has not been specified by the user for the data segment, the system generates a data packet comprising the data segment, wherein a destination for the data packet corresponds to a target disk specified by the calculated storage path.

In a variation on this embodiment, generating the data segment from the data file includes one of: merging the data file with a second data file; splitting the data file and generating a second data segment from part of the data file; and incorporating the data file into the data segment in its entirety.

In a variation on this embodiment, the data packet is a remote direct memory access (RDMA) packet that allows a write operation on the target disk without requiring processing from a central processing unit (CPU) at a storage server hosting the storage disk.

In a variation on this embodiment, the system determines the storage key for the data segment by applying a hash function to the metadata of the data segment. The storage key can include one or more of: (i) a first key segment corresponding to a storage server; (ii) a second key segment corresponding to a disk of the storage server; and (iii) a third key segment corresponding to a volume of the disk.

In a variation on this embodiment, if a user-defined storage path has been specified by the user for the data segment, the system obtains the user-defined storage path for the data segment, and stores a mapping between the user-defined storage path and the metadata in a monitor server of the distributed storage system. The monitor server is configured to verify data consistency for the distributed storage system. The system then sets the destination of the data packet based on a target disk specified by the user-defined storage path.

In a further variation, the system selects between the calculated storage path and the user-defined storage path based on an indicator indicating that the user-defined storage path has been specified by the user for the data segment.

In a variation on this embodiment, the system stores a plurality of replicas of the data segment in a plurality of target disks specified by a plurality of storage paths indicated by the storage key.

In a variation on this embodiment, if the system determines a read operation associated with the data file, the system generates the storage key for the data segment by applying the hash function to the metadata of the data segment. If the system determines that a user-defined storage path has not been specified by the user for the data segment, the system generates a command packet comprising an instruction for retrieving the data segment. The destination of the data packet corresponds to the target disk specified by the calculated storage path.

In a further variation, the system determines whether a user-defined storage path has been specified by the user for the data segment by applying a bloom filter to determine whether the key has been generated.

In a further variation, if the system determines that a user-defined storage path has been specified by the user for the data segment, the system checks a local read cache for the user-defined storage path associated with the metadata. If the system detects a cache miss, the system obtains the user-defined storage path from a monitor server of the distributed storage system based on the metadata. The monitor server maintains a mapping between the user-defined storage path and the metadata.

BRIEF DESCRIPTION OF THE FIGURES

In the figures, like reference numerals refer to the same figure elements.

DETAILED DESCRIPTION

Figure 1A:
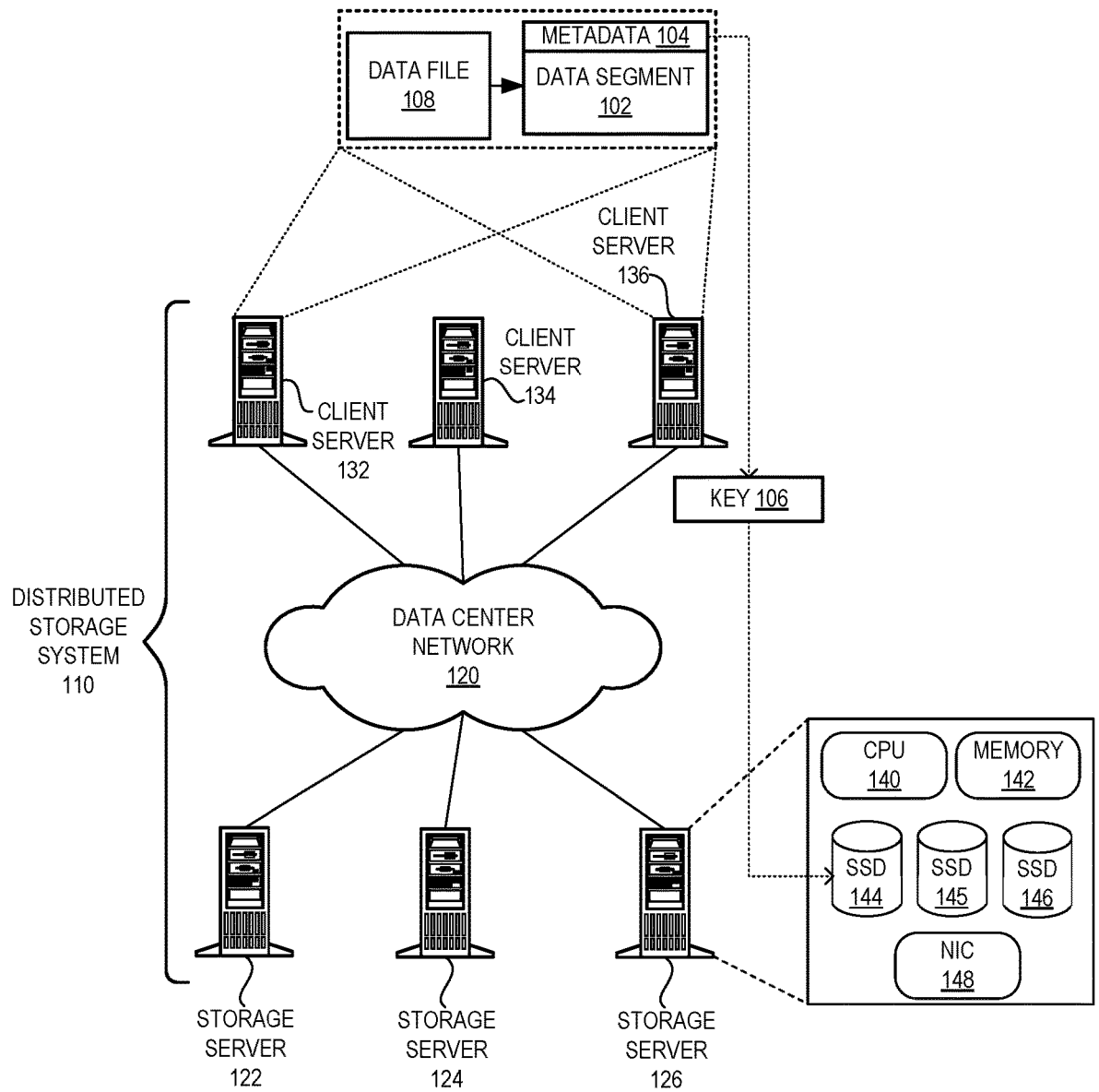
FIG. 1A illustrates an exemplary lightweight distributed storage system facilitating key-based data storage, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the embodiments described herein are not limited to the embodiments shown, but are to be accorded the widest scope consistent with the principles and features disclosed herein.

Overview

The embodiments described herein solve the problem of reducing the latency in a distributed storage system by simplifying the storage and retrieval process of data files, thereby facilitating a lightweight distributed storage system. The system uses key-based and user-defined storage paths to store or retrieve (e.g., based on write or read operation, respectively) data segments. In this way, the system can directly store and retrieve the data segment without complex computations and overheads, leading to a lightweight and simplified storage process with low latency.

With existing technologies, a master node of a storage system is responsible for determining the storage locations of a data file. To store or retrieve a data file, a client server of the storage system queries the master node for obtaining the target location in a storage server. As a result, the master node can become a performance bottleneck for the performance of the storage system. Furthermore, since the query needs to resolve before the client server can store the data file, the storage process can have increased latency. In addition, if different client servers request a target location for the same file, the master node may provide different target locations to the different client servers. Hence, the same file can be stored multiple times in the storage servers, thereby causing file duplication and inefficient storage in the storage servers.

To solve this problem, embodiments described herein provide a lightweight distributed storage system that can use key-based or user-defined storage paths to store (or retrieve) one or more replicas of a data segment. During operation, a client server of the system determines the data files that need to be stored (e.g., need a write operation) and converts them to uniform data segments. The uniform data segments can have the same size. The system can split a file or merge multiple files to generate the data segments. The system then generates a storage key for a respective data segment. The system can use a hash function on the metadata of the data segment to generate the key. The key indicates the storage path, which can also be referred to as a calculated storage path, for the replicas of the data segment, such as a target storage server, a disk of the storage server, and a volume on the disk (e.g., /server_1/disk_1/volume_1). For example, if the system generates three replicas for each data segment, the key can indicate three storage paths corresponding to three target locations.

A storage key can be unique for each data segment. The hash function applied on two different sets of metadata of two different data segments can generate two different keys. As a result, the key can uniquely identify the data segment and its location in the system. Furthermore, the hash function can generate the key in such a way that the data segments are load balanced across the disks of the storage server. In addition, since the files are stored as uniform data segments, a client server of the system can use remote direct memory access (RDMA) to directly write to or read from the disk of the storage server.

On the other hand, since multiple copies of the same file (e.g., a song) at a different client server can have the same metadata (e.g., same file name and type, same file size, etc.), the hash function generates the same key for the multiple copies. As a result, instead of storing multiple copies of the same file in the storage servers, the system simply stores one copy. The key points to the stored copy for any subsequent storage request for the other copies. In this way, the lightweight distributed storage system provides efficient and simplified storage with reduced latency and data duplication.

It should be noted that data duplication is distinct from data replication. Data replication is storing multiple copies of the same file in different disks to ensure high availability (e.g., failure recovery). On the other hand, data duplication causes repeated storage of replicas of the same file. The lightweight distributed storage system can facilitate data replication without data duplication.

In some embodiments, the system allows a user (e.g., an administrator) to define storage paths for a data segment. This process of defining paths can be referred to as user nomination for the data segment. Such user-defined paths provide the user freedom of data placement and meet any specific condition (e.g., rack organization, Ethernet switch configuration, etc.) for a data segment. This allows the user to isolate potential failure zones. The system can maintain a record of the user-defined paths in the monitor servers. A storage system typically includes a number of monitor servers for verifying the data consistency. If user nomination is enabled for a data segment, the client server enables an indicator in the local metadata of the data segment. The client server can obtain the user-defined paths from the monitor servers for storing and retrieving the data segment instead of the system-generated key. In this way, the system integrates user nomination and key-based data storage in a flexible way.

The term "distributed storage system" refers to a set of client servers interacting through a set of storage servers via a network, such as a data center network.

A "client" or a user associated with a client refers to an entity which communicates with a distributed storage system via a network, such as the Ethernet.

The term "client server" refers to a client-serving machine, which is part of a distributed storage system.

The term "storage cluster" refers to a group of storage servers.

The term "storage server" refers to a server in a distributed storage system. A storage server can have multiple disks, where data may be written to a disk for persistent storage. A disk can receive data directly from a client server (or a client-serving machine). A disk can also include a storage, storage medium, or other storage means associated with the disk.

Exemplary System

FIG. 1A illustrates an exemplary lightweight distributed storage system facilitating key-based data storage, in accordance with an embodiment of the present application. A distributed storage system 110 can include: client servers (or client-serving machines) 132, 134, and 136; and storage servers 122, 124, and 126. Client servers 132, 134, and 136, and storage servers 122, 124, and 126 can communicate with each other via a data center network 120. A storage server can include multiples disks. For example, storage server 126 can include components such as a central processing unit (CPU) 140, a memory 142 (e.g., a dual in-line memory module), a network interface card (NIC) 148, and a number of disks 144, 145, and 146. These disks can be solid state drives (SSDs).

With existing technologies, system 110 can include a master node responsible for determining the storage locations of a data file 108. To store or retrieve data file 108, client server 136 queries the master node for obtaining the target location in a storage server, such as storage server 126. As a result, the master node can become a bottleneck for the performance of system 110. Furthermore, since the query needs to be resolved before client server 136 can store data file 108, the process of storing data file 108 in storage server 126 can have increased latency. In addition, if a different client server 132 requests a target location for the same data file 108, the master node may provide a different target location to client server 132. Hence, data file 108 can be stored multiple times in the same or different storage servers, thereby causing file duplication and inefficient storage in storage servers 122, 124, and 126.

To solve this problem, system 110 can operate as a lightweight distributed storage system that can use key-based or user-defined storage paths to store (or retrieve) data file 108. During operation, client server 136 determines that data file 108 needs to be stored (e.g., needs a write operation) and converts data file 108 to a data segment 102. A respective data segment generated by system 110 can have the same size, which ensures direct storage and access in the storage servers. Client server 136 can split a file or merge multiple files to generate a data segment.

Client server 136 then generates a storage key 106 for data segment 102. Client server 136 can apply a hash function on metadata 104 of data segment 102 to generate key 106. Metadata 104 can include one or more of: the name of data file 108, the type of data file 108, the date and time data file 108 has been created, and the date and time data file 108 has been last modified. If a data segment corresponds to multiple files, the metadata of that segment can include the name, type, and date/time information of those multiple files. Key 106 can indicate the storage path for a respective replica of data segment 102. The storage path indicates a target location (i.e., where a data segment is stored) and can include a target storage server, a disk of the storage server, and a volume on the disk (e.g., /server_1/disk_1/volume_1). For example, if system 110 generates three replicas for each data segment, key 106 can indicate three target locations.

Key 106 can be unique for data segment 102. As a result, a key generated for any other data segment that has a different set of metadata would not match key 106. In other words, if client server 136 applies the hash function applied on two different sets of metadata of two different data segments, the resultant keys are distinct from each other. As a result, key 106 can uniquely identify data segment 102 and the locations of the replicas of data segment 102 in storage servers 122, 124, and 126. Furthermore, the hash function can generate key 106 in such a way that replicas of data segment 102 are load balanced across the disks of storage servers 122, 124, and 126.

In addition, since data file 108 can be stored as a data segment 102, client server 136 can use RDMA to directly write to or read from disk 144 of storage server 126. System 110 can incorporate the input/output (I/O) stack in the user space of client server 136 and storage server 126. Instead of using the file system of the operating system, client server 136 incorporates system 110 in the user space. Client server 136, in the user space, generates data segment 102, includes an RDMA command and data segment 102 in a data packet (e.g., an RDMA data transfer packet), and sends the data packet to storage server 126 via network 120. Upon receiving the data packet, storage server 126 executes the RDMA transfer to disk 144 based on the RDMA command. In this way, system 110 reduces the latency associated with context switching and kernel modules of the operating system, thereby improving the performance of system 110.

Upon storing data segment 102 in disk 144 (and in any other disk in storage server 126 indicated by key 106), storage server 126 generates an acknowledgment of a successful storage of data segment 102 in disk 144 and sends the acknowledgment to client server 136. In this way, client server 136 determines that data segment 102 has been successfully stored. If client server 136 does not receive the acknowledgment within a predetermined time (i.e., a timeout occurs), client server 136 can reissue the RDMA command and resends the packet to storage server 126.

On the other hand, since multiple copies of data file 108 at different client servers 132 and 136 can have the same metadata 104 (e.g., same file name and type, same file size, etc.), the hash function at client server 132 generates the same key 106 for the copy of data file 108 in client server 132 as well. Similarly, client server 132 generates the same data segment 102 from data file 108. As a result, when client server 132 initiates the storage of data segment 102, key 106 points to the same storage path for that copy of data segment 102. As a result, instead of storing multiple copies of the replicas of data segment 102, storage server 126 simply points to the stored copy from client server 136 and sends a corresponding acknowledgment to client server 132. Client server 132 can retrieve data segment 102 by obtaining the storage path from key 106 generated from metadata 104. In this way, system 110 provides efficient and simplified storage with reduced latency and data duplication.

Figure 1B:
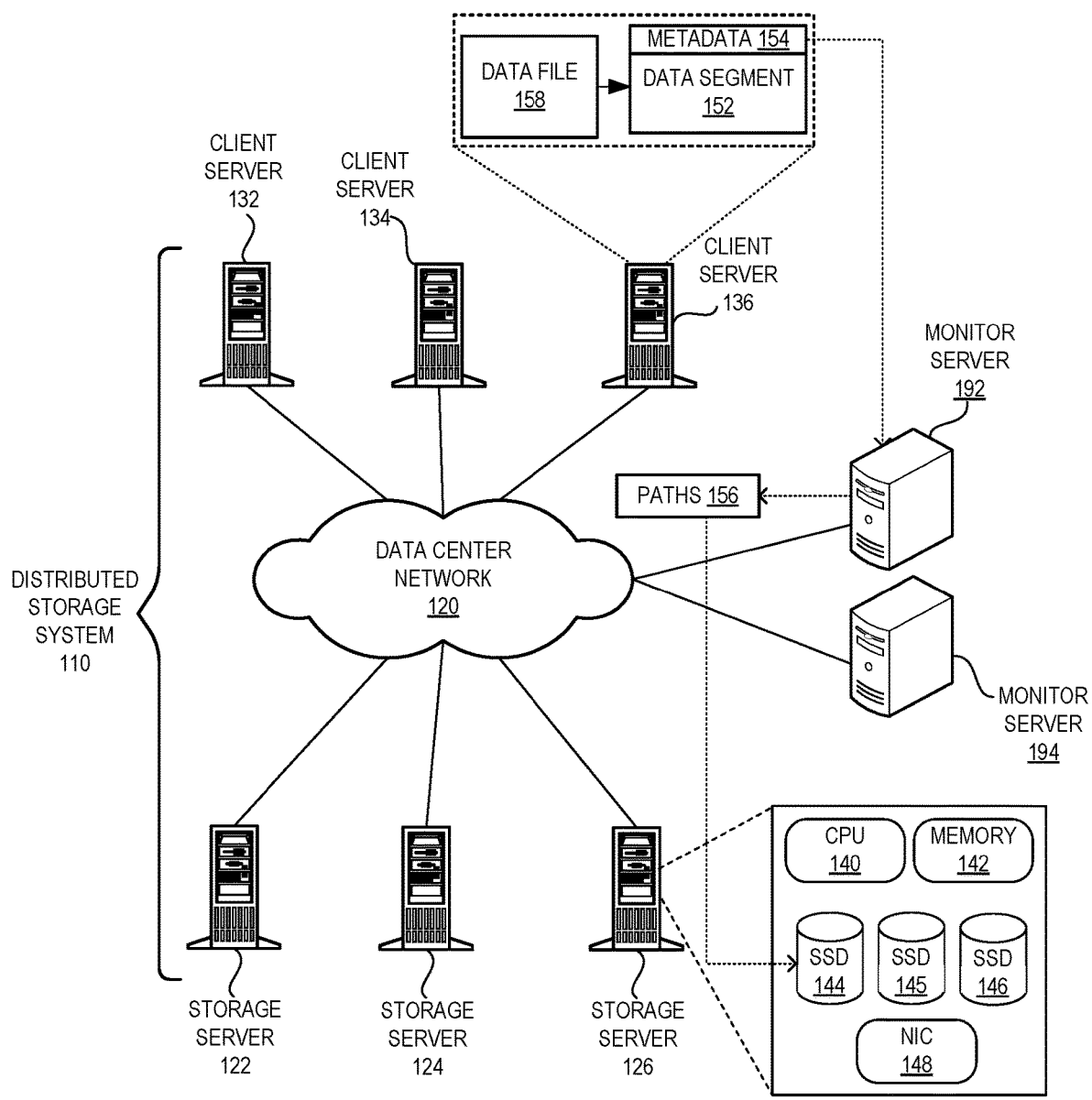
FIG. 1B illustrates an exemplary lightweight distributed storage system facilitating user-nomination-based data storage, in accordance with an embodiment of the present application.

FIG. 1B illustrates an exemplary lightweight distributed storage system facilitating user-nomination-based data storage, in accordance with an embodiment of the present application. In this example, system 110 can include a number of monitor servers 192 and 194 for verifying the data consistency of the data stored in storage servers 122, 124, and 126. In the example in FIG. 1B, monitor server 192 (or 194) can determine whether the stored data in storage servers 122, 124, and 126 is consistent based on a cyclic redundancy check (CRC). If monitor server 192 detects an error in a replica, monitor server 192 determines that the replica has been corrupted and identifies a correct replica that does not have an error using the CRC. Monitor server 192 then can replace the corrupted replica with the correct one.

During operation, client server 136 determines that data file 158 needs to be stored (e.g., needs a write operation) and converts data file 158 to a data segment 152. Client server 136 can split a file or merge multiple files to generate a data segment. In this example, system 110 allows a user (e.g., an administrator) to define storage paths 156 for a data segment 152. This process of defining paths can be referred to as user nomination for the data segment. Paths 156 provide the user freedom of data placement and meet any specific condition (e.g., rack organization, Ethernet switch configuration, etc.) for data segment 152. This allows the user to isolate potential failure zones for data segment 152.

System 110 can maintain a record of user-defined paths 156 in monitor servers 192 and/or 194. This record can be a mapping between metadata 154 of data segment 152 and user-defined paths 156. The number of paths 156 can depend on the number of replicas needed for file 158. If user nomination is enabled for data segment 152, client server 136 can enable a local indicator for data segment 152 (e.g., a local flag, which can be in metadata 154). Based on the indicator, client server 136 determines that data segment 152 should be stored based on paths 156.

Even though user nomination is enabled for data segment 152, client server 136 may generate a local key for data segment 152 using the hash function. However, upon determining that user nomination is enabled, client server 136 may not use the key (e.g., can discard the key). Client server 136 can then obtain paths 156 from monitor server 192 (or 194) based on metadata 154. For example, one of paths 156 can point to disk 144. Client server 136 then stores data segment 152 in disk 144 based on the path. In this way, system 110 integrates user nomination and key-based data storage in storage servers 122, 124, and 126 in a flexible way.

Figure 1C:
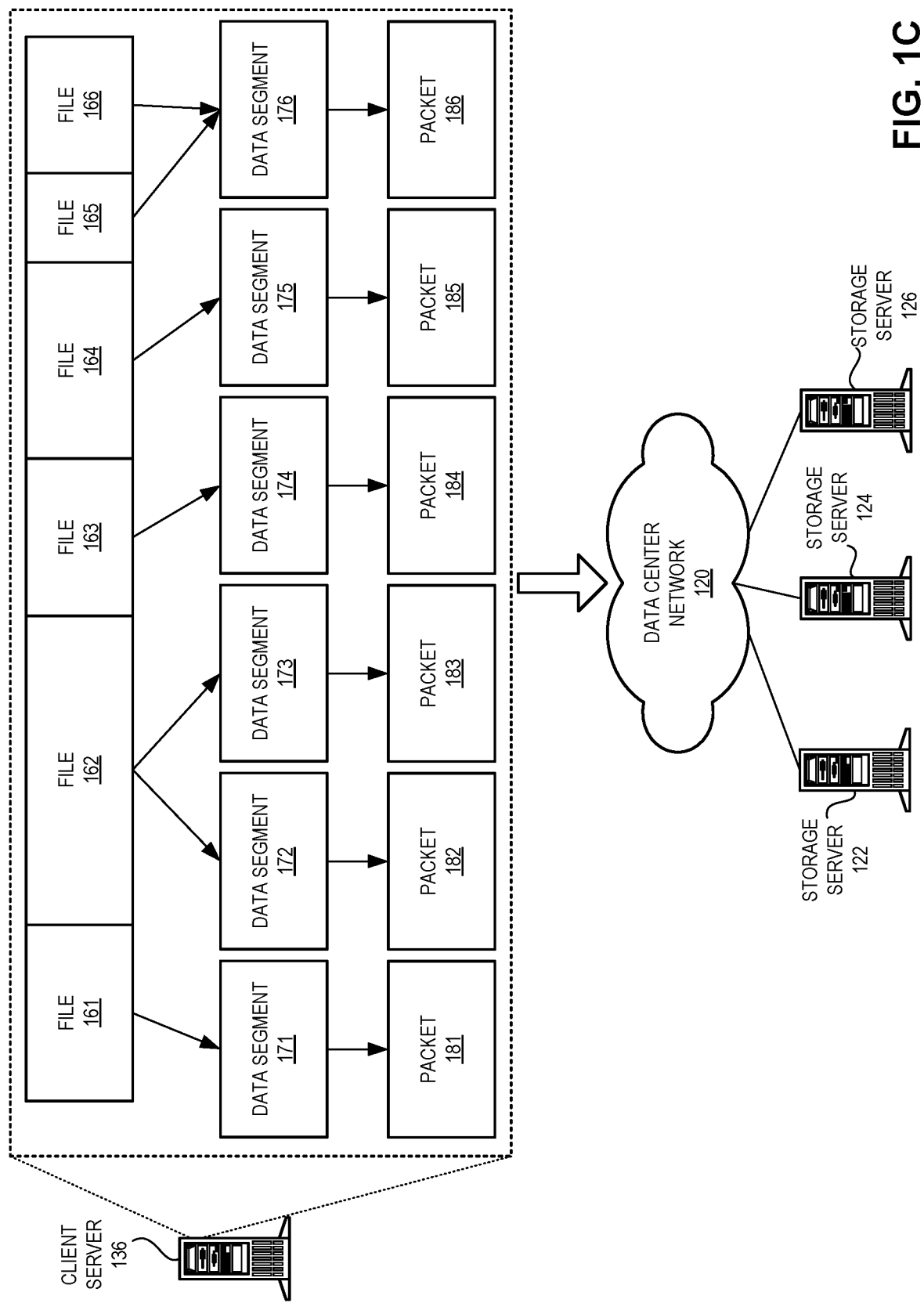
FIG. 1C illustrates an exemplary distributed file storage based on data segments in a lightweight distributed storage system, in accordance with an embodiment of the present application.

FIG. 1C illustrates an exemplary distributed file storage based on data segments in a lightweight distributed storage system, in accordance with an embodiment of the present application. During operation, client server 136 determines that files 161, 162, 163, 164, 165, and 166 need to be stored. Client server 136 then converts these files to uniform data segments 171, 172, 173, 174, 175, and 176. These data segments can be uniform in size. The size of a data segment can depend on one or more of: a user configuration and a standard packet size (e.g., Ethernet frame size). If file 162 is larger than the size of a data segment, file 162 can be split into two data segments 172 and 173. On the other hand, if the combined size of multiple files 165 and 166 is smaller than or equal to the size of a data segment, files 165 and 166 can be combined into a data segment 176.

Similarly, client server 136 converts files 161, 163, and 164 to data segments 171, 174, and 175, respectively. After generating a data segment, if client server 136 determines that the data segment includes unallocated bits and no other file can fit in that data segment, client server 136 can insert padding bits of a specific pattern into the unallocated bits. In this way, client server 136 ensures that the data segments remain uniform in size. Client server 136 determines respective keys for data segments 171, 172, 173, 174, 175, and 176, and determines the storage paths for these data segments using corresponding keys or user-defined paths.

Client server 136 then includes data segments 171, 172, 173, 174, 175, and 176 into packets 181, 182, 183, 184, 185, and 186, respectively, with corresponding storage instructions (e.g., RDMA instructions). Client server 136 determines respective destination addresses for packets 181, 182, 183, 184, 185, and 186 based on the corresponding paths and sends these packets to storage servers 122, 124, and 126 via network 120. In this way, client server 136 converts data files of different sizes to uniform data segments and stores the data segments in storage servers 122, 124, and 126, thereby allowing simplified storage of the data files.

Efficient Data Storage

Figure 2A:
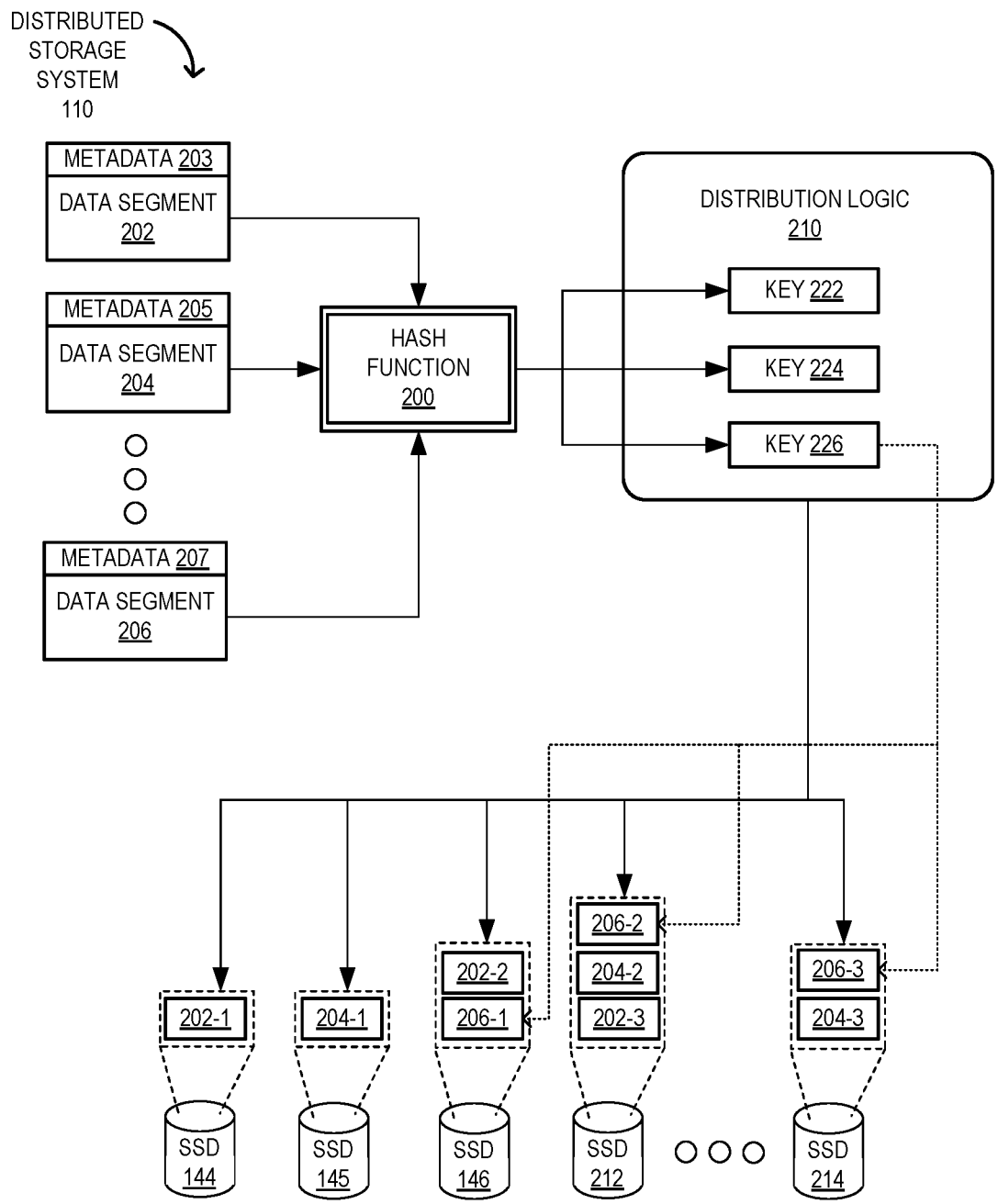
FIG. 2A illustrates an exemplary data storage in a lightweight distributed storage system using key-based storage paths, in accordance with an embodiment of the present application.

FIG. 2A illustrates an exemplary data storage in a lightweight distributed storage system using key-based storage paths, in accordance with an embodiment of the present application. During operation, system 110 obtains metadata 203, 205, and 207 of a number of data segments 202, 204, and 206. System 110 applies a hash function 200 on metadata 203, 205, and 207 to generate keys 222, 224, and 226, respectively. Hash function 200 can generate keys 222, 224, and 226 to implement a distribution logic 210, which can be based on a distribution policy. This distribution policy can be based on one or more of: load balancing, storage availability, disk performance, round robin, and bus speed. System 110 applies hash function 200, for both read and write operations, to generate keys 222, 224, and 226 in real-time.

Distribution logic 210 of system 110 stores data segments 202, 204, and 206 in different disks of the storage servers of system 110. Distribution logic 210 can run on each client server of system 110. Suppose that system 110 includes disks 144, 145, 146, 212, and 214 distributed across a number of storage servers of system 110. If system 110 stores three replicas for each data segment, each of keys 222, 224, and 226 indicates at least three storage paths. These three storage paths are generated based on the distribution policy. For example, hash function 200 can generate the storage paths in key 222 in such a way that the replicas of data segment 202 are load balanced across the disks.

Based on key 222, distribution logic 210 stores three replicas 202-1, 202-2, and 202-3 of data segment 202 in disks 144, 146, and 212, respectively. As described in FIG. 1A, disks 144 and 146 are in storage servers 136. Hence, the same storage server can store multiple replicas of the same data segment, preferably in different disks. In the same way, based on key 224, distribution logic 210 stores three replicas 204-1, 204-2, and 204-3 of data segment 204 in disks 145, 212, and 214, respectively. If disks 145, 212 and 214 are in different storage servers, distribution logic 210 can store the replicas of the same data segment in the disks of different storage servers. Similarly, based on key 226, distribution logic 210 stores three replicas 206-1, 206-2, and 206-3 of data segment 206 in disks 146, 212, and 214, respectively.

Even though system 110 stores data segments 202, 204, and 206 in the disks, system 110 maintains a copy of metadata 203, 205, and 207 in the client servers. To retrieve a data segment, such as data segment 206, system 110 applies hash function 200 to metadata 207 of data segment 202 to obtain key 226 and determines that three replicas 206-1, 206-2, and 206-3 of data segment 206 are stored in disks 146, 212, and 214, respectively. System 110 determines which disk among disks 146, 212, and 214 can provide data segment 206 efficiently based on one or more of: disk and/or server load, disk response time, and network latency. If system 110 determines that disk 214 can provide data segment 206 efficiently, system 110 issues an instruction (e.g., an RDMA command) to obtain replica 206-3 based on the corresponding storage path in key 226.

Figure 2B:
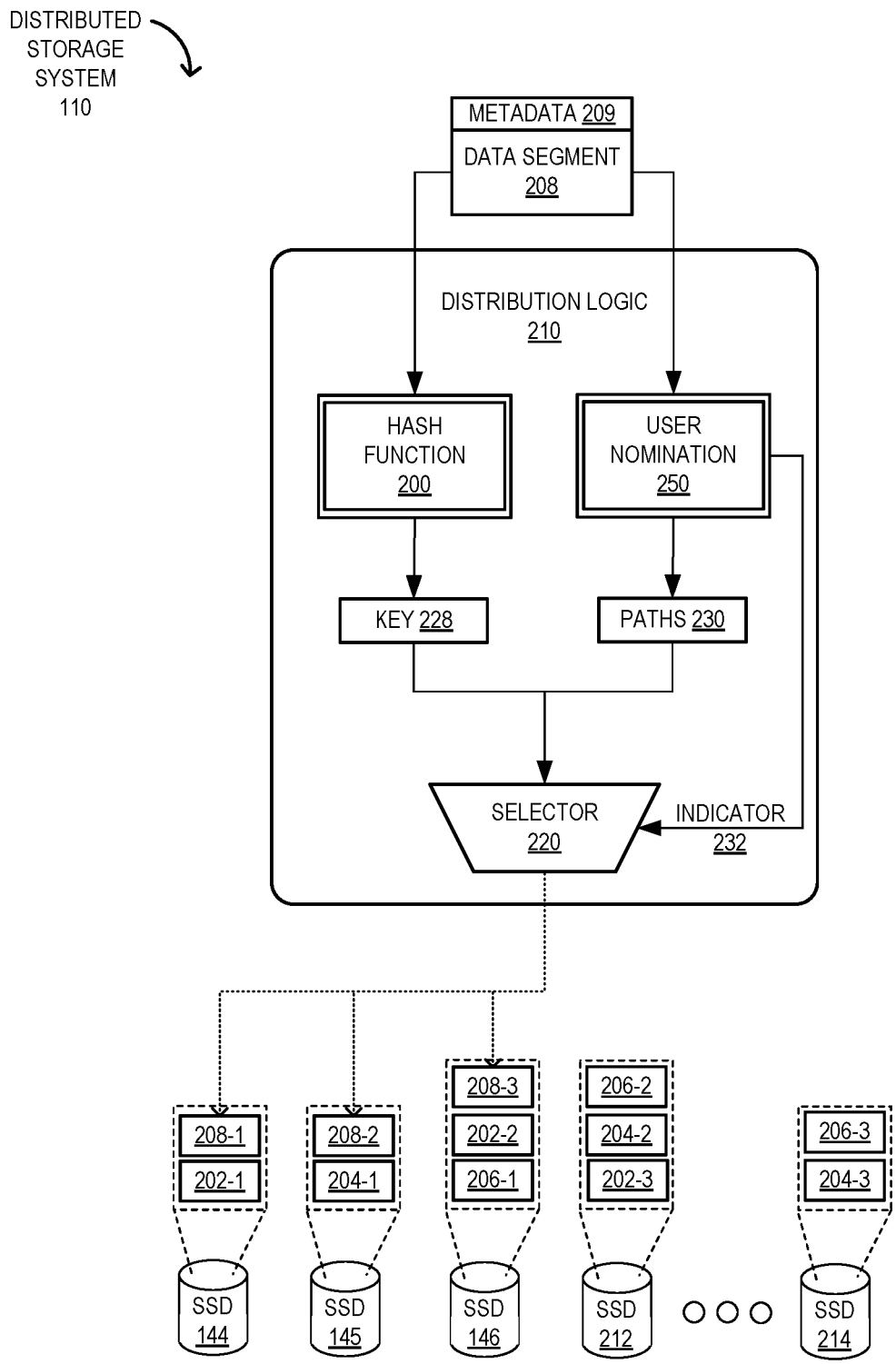
FIG. 2B illustrates an exemplary flexible data storage in a lightweight distributed storage system using key- and user-nomination-based storage paths, in accordance with an embodiment of the present application.

FIG. 2B illustrates an exemplary flexible data storage in a lightweight distributed storage system using key- and user-nomination-based storage paths, in accordance with an embodiment of the present application. During operation, system 110 allows a user to enable user nomination 250 for a data segment 208. An indicator 232 can indicate that user nomination has been enabled for data segment 208. As a result, the user can define paths 230 to apply user nomination 250. The user can define paths 230 for one or more of: load balancing, storage availability, disk performance, round robin, and bus speed.

System 110 can also apply hash function 200 on metadata 209 of data segment 208 to generate key 228. Distribution logic 210 can then include a selector 220 that selects the storage paths for data segment 208 from key 228 and user-defined paths 230. Distribution logic 210 checks indicator 232 to determine whether user nomination 250 has been enabled for data segment 208. If distribution logic 210 determines that user nomination has been enabled for data segment 208, distribution logic 210 can discard key 228 and set user-defined paths 230 as the storage paths for data segment 208. Based on paths 230, distribution logic 210 stores three replicas 208-1, 208-2, and 208-3 of data segment 208 in disks 144, 145, and 146, respectively. In this example, the user-defined paths ensure that the replicas of data segment 208 are stored in the disks of the same storage server 126, as described in conjunction with FIG. 1B.

System 110 also stores a mapping between metadata 209 and paths 230 in the monitor servers. Even though system 110 stores data segment 208 in the disks, system 110 maintains a copy of metadata 209 in the client servers. To retrieve data segment 208, system 110 determines based on indicator 232 that user nomination is enabled for data segment 208. System 110 then obtains paths 230 from the monitor servers based on metadata 209 and determines that three replicas 208-1, 208-2, and 208-3 of data segment 208 are stored in disks 144, 145, and 146, respectively. System 110 determines which disk among disks 146, 212, and 214 can provide data segment 208 efficiently based on one or more of: disk and/or server load, disk response time, and network latency. If system 110 determines that disk 214 can provide data segment 208 efficiently, system 110 issues an instruction (e.g., an RDMA command) to obtain replica 208-3 based on the corresponding storage path in paths 230.

Figure 3A:
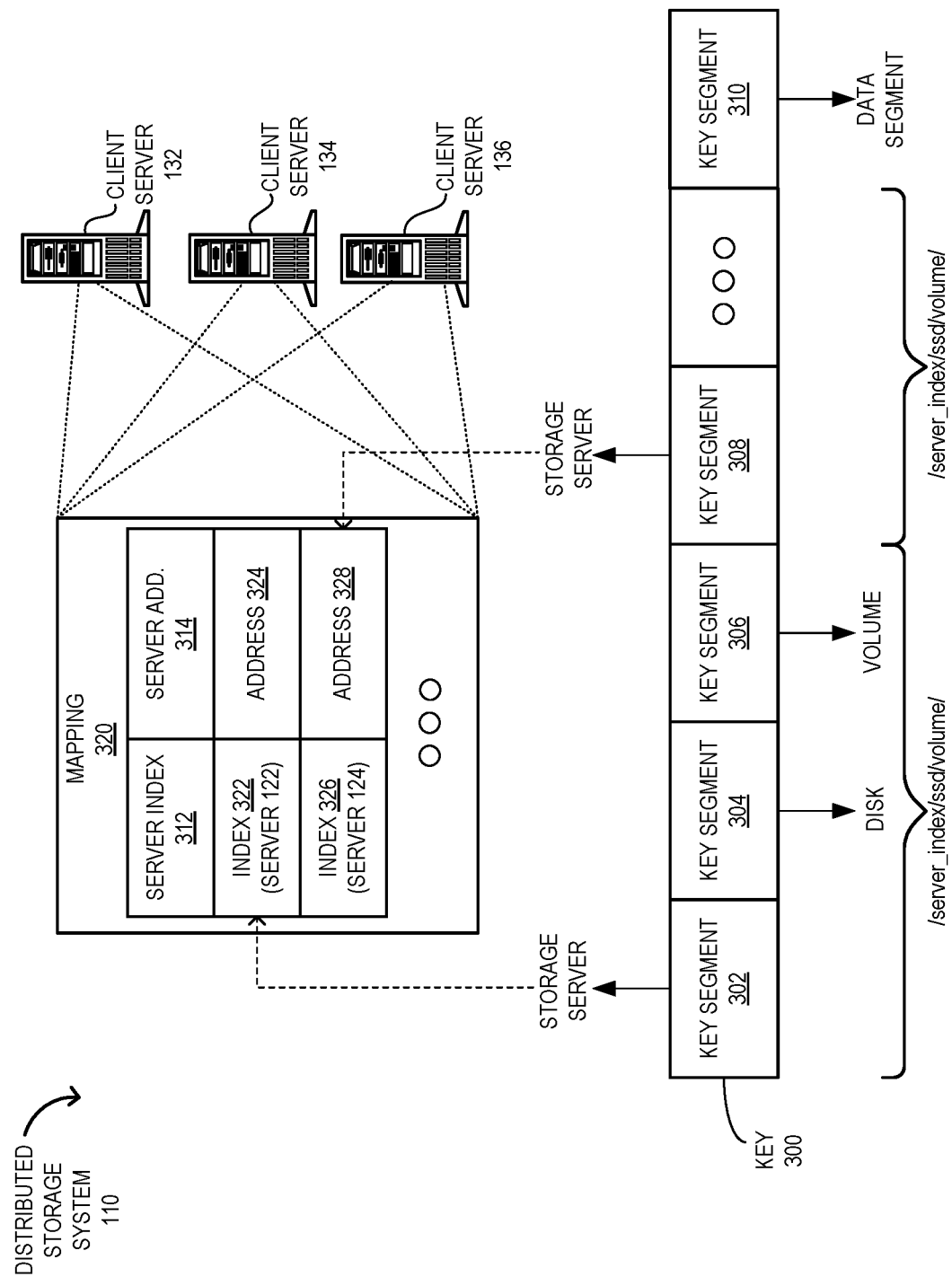
FIG. 3A illustrates an exemplary storage key indicating a set of storage paths in a lightweight distributed storage system, in accordance with an embodiment of the present application.

FIG. 3A illustrates an exemplary storage key indicating a set of storage paths in a lightweight distributed storage system, in accordance with an embodiment of the present application. A storage key 300 can indicate the target locations for a respective replica of a data segment. Length of key 300 can depend on the hash function that generates key 300. Key 300 can include a number of key segments 302, 304, 306, 308, and 310 of varying or equal length. For example, the number of bits in key segments 302 and 304 can be equal or different. Since key 300 can indicate the target location for a data segment, each key segment can indicate a part of the target location. In this example, key segments 302, 304, and 306 can point to a storage server, a disk on the storage server, and the volume on the disk, respectively. Hence, key segments 302, 304, and 306 together can indicate a storage path "/server_index/ssd/volume/" for a replica of the data segment.

Similarly, key segment 308 can point to the next storage server for the next replica. In this way, key segment 308 and its subsequent data segments together can indicate a storage path "/server_index/ssd/volume/" for the next replica of the data segment. If at least three replicas of the data segment are stored, key 300 can indicate at least three such storage paths. In addition to the locations of the data segment, key 300 can also identify the data segment. For example, key segment 310 can identify the data segment, and the bits in key segment 310 can be an identifier of the data segment.

The bits in key segments 302 and 308 can identify two target storage servers for two replicas of the data segment. Key segment 302 can indicate a server index, which identifies a storage server in system 110. If system 110 includes three storage servers, key segment 302 can include 2 bits to represent the server index. For example, key segments 302 and 308 can include bits "10" and "11," indicating two storage servers. To determine the location of the corresponding storage servers for sending the data segments, a respective client server maintains a mapping 320. Each entry of mapping 320 maps a server index 312 to a corresponding server address 314. Server address 314 can include one or more of: an Internet Protocol (IP) address of a storage server, a media access control (MAC) address of the storage server, and a tunnel address and/or identifier leading to a storage address.

Mapping 320 can include server indices 322 and 326 corresponding to storage servers 122 and 124, respectively. Server indices 322 and 326 can be mapped to server addresses 324 and 328 of storage servers 122 and 124, respectively. Suppose that key segments 302 and 308 are associated with server addresses 324 and 328, and key 300 is generated in client server 132. Client server 132 then obtains server addresses 324 and 328 from mapping 320 based on key segments 302 and 308, respectively. Client server 132 uses server addresses 324 and 328 to send the data segment to storage servers 122 and 124, respectively.

Figure 3B:
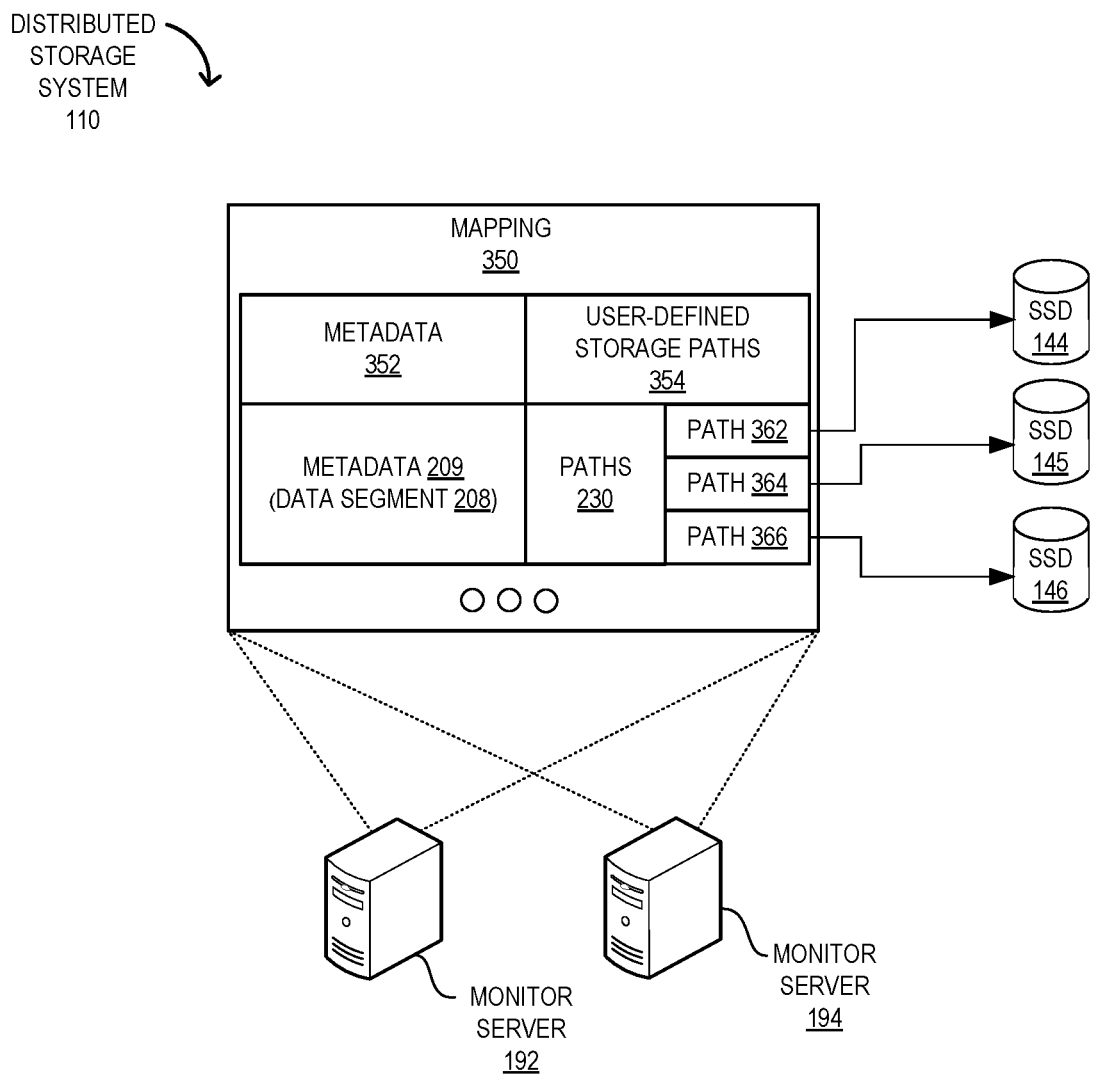
FIG. 3B illustrates an exemplary mapping of user-defined storage paths in a lightweight distributed storage system, in accordance with an embodiment of the present application.

As described in conjunction with FIG. 2B, to maintain a record of user-defined paths 230 for data segment 208, system 110 stores a mapping between metadata 209 of and paths 230 in the monitor servers. FIG. 3B illustrates an exemplary mapping of user-defined storage paths in a lightweight distributed storage system, in accordance with an embodiment of the present application. During operation, to record the user-defined paths, system 110 maintains a mapping 350 between metadata 352 and corresponding user-defined storage paths 354 in monitor servers 192 and 194. Metadata 352 includes metadata of data segments for which user nomination has been enabled.

For example, system 110 stores a mapping between metadata 209 and user-defined paths 230 since user nomination has been enabled for data segment 208. Paths 230 can include user-defined paths 362, 364, and 366, each of which can be a storage path to one of the replicas of data segment 208. Paths 362, 364, and 366 can correspond to the three replicas 208-1, 208-2, and 208-3 of data segment 208 in disks 144, 145, and 146, respectively.

Even though paths 230 are stored in monitor servers 192 and 194, the client servers of system 110 can use the read cache to decrease the average time to retrieve paths from monitor servers 192 and 194. The read cache can include the paths that have been used recently. If a path is not accessed for a period of time, system 110 can remove that path from the read cache. In some embodiments, the client servers of system 110 can synchronize the read cache (e.g., periodically). Hence, if a user-defined path is obtained from one client server of system 110, the same path can be retrieved from the read cache of another client server.

It should be noted that user-defined paths 354 can be a small fraction of all storage paths. Hence, storing the most frequent paths in the read cache can reduce the read access time to obtain mapping 350 from monitor servers 192 and 194 frequently. In this way, system 110 reduces the frequency at which mapping 350 is accessed and the long tails of the access latency.

User-Space Direct Data Transfer

Figure 4A:
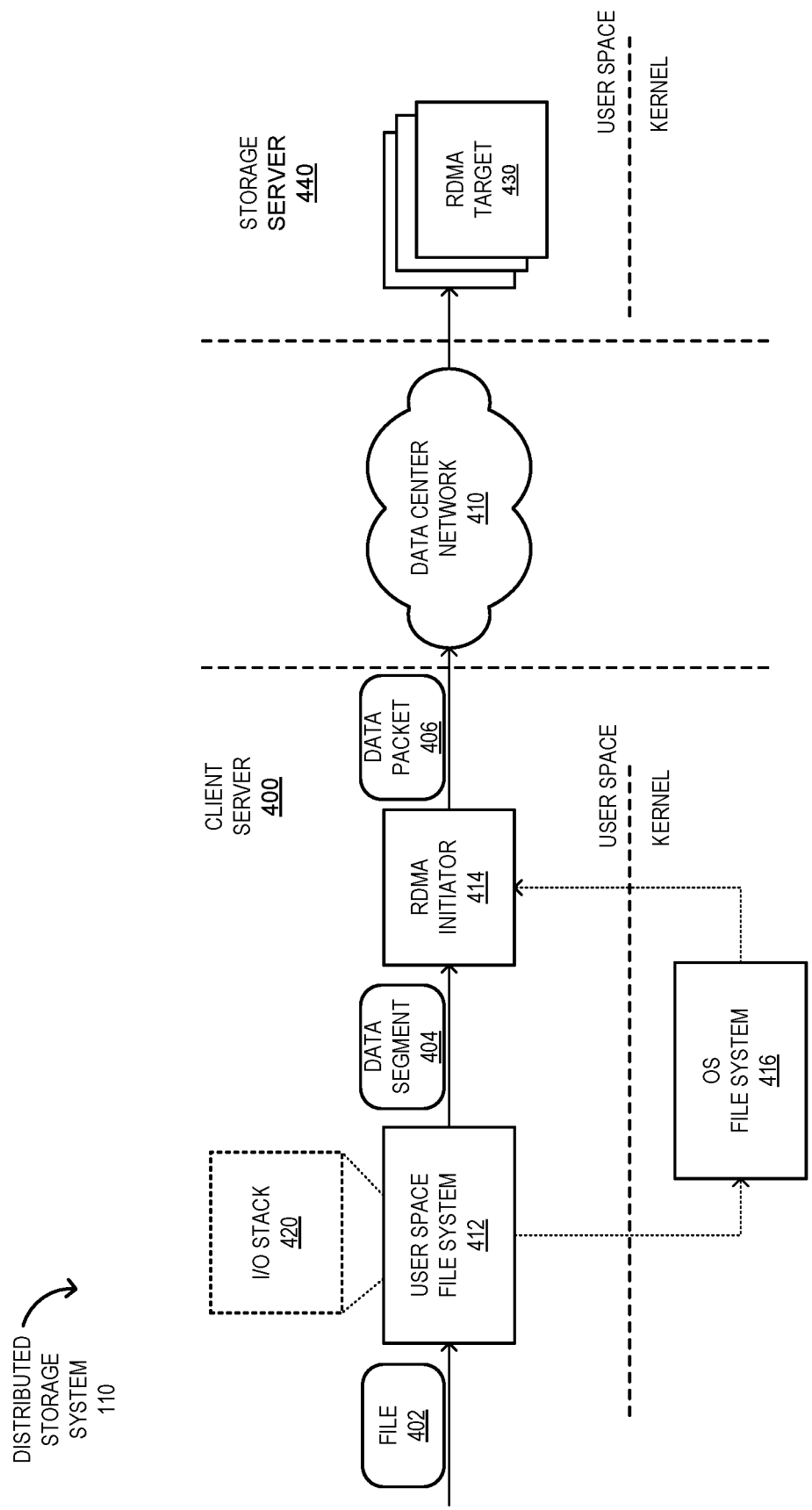
FIG. 4A illustrates an exemplary user-space data transfer in a lightweight distributed storage system, in accordance with an embodiment of the present application.

FIG. 4A illustrates an exemplary user-space data transfer in a lightweight distributed storage system, in accordance with an embodiment of the present application. In client server 400 of system 110, input/output (I/O) stack 420 for performing the read and/or write operations for system 110 can reside in user space file system 412 instead of the traditional operating system (OS) file system 416. As a result, client server 400 converts a file 402 to a data segment 404 in user space file system 412.

In some embodiments, I/O stack 420 uses an RDMA initiator 414 to generate a data packet 406, which includes data segment 404 and an RDMA instruction to store data segment 404. To do so, RDMA initiator 414 can incorporate data segment 404 into a buffer and passes the buffer as a parameter to an RDMA write command corresponding to the instruction. RDMA initiator 414 then transmits packet 406 via data center network 410 (e.g., an RDMA network). At a storage server 440, data segment 404 is directly stored into an RDMA target 430, which can be a disk of storage server 440. The storing process at storage server 440 can also be implemented in the user space. System 110, thus, further improves the performance of I/O transfer by reducing the latency associated with context switching and kernel modules of an operating system.

Figure 4B:
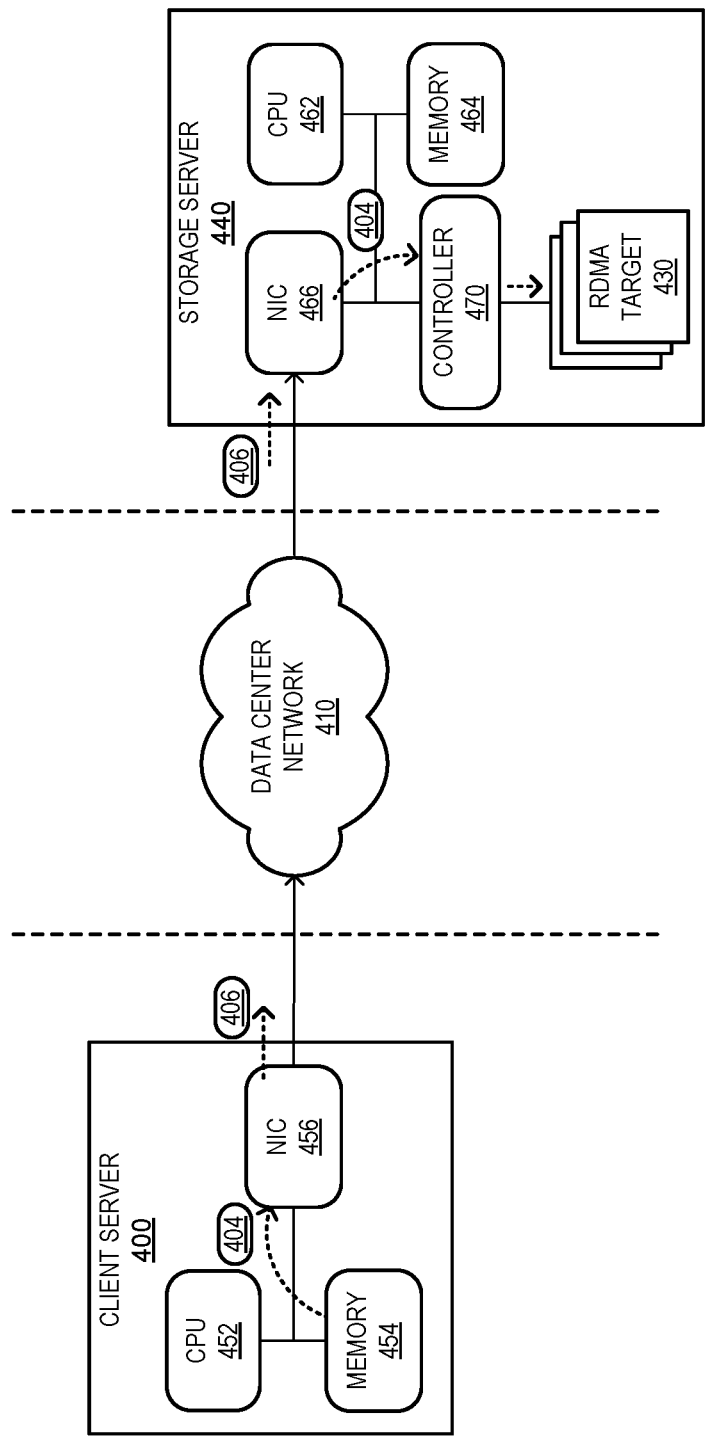
FIG. 4B illustrates an exemplary remote direct access data transfer in a lightweight distributed storage system, in accordance with an embodiment of the present application.

FIG. 4B illustrates an exemplary remote direct access data transfer in a lightweight distributed storage system, in accordance with an embodiment of the present application. In this example, client server 400 includes a CPU 452, a memory 454 (e.g., a DIMM), and a NIC 456. Storage server 440 includes a CPU 462, a memory 464, and a NIC 466. Data segment 404 is moved from memory 454 to NIC 456. Data segment 404 is inserted into a packet 406, which is then transmitted via network 410 based on the storage path associated with data segment 404. Storage server 440 receives packet 406 via NIC 466, obtains the buffer representing data segment 404, and provides the buffer to a disk controller 470. Controller 470 is responsible for managing data in RDMA target 430.

Controller 470 adjusts the format of the data in the buffer into data segment 404 and writes into an individual disk of RDMA target 430. When data packet 406 enters NIC 466, packet 406 is transformed and sent to the disk (e.g., Non-Volatile Memory express (NVMe) SSD) through the Peripheral Component Interconnect express (PCIe) bus directly. This process may not require CPU involvements in client server 400 and storage server 440. System 110, thus, forms a lightweight system for high-density storage by reducing latency and increasing I/O per second (IOPS).

In doing so, system 110 simplifies storage paths to storage server 440 by removing the redundant steps and complex structures. System 110 calculates the storage paths using the hash function in real-time. The paths are generated for both read and write operations. The minority of paths are user nominated, and they are mostly cached at the client servers with a high cache hit rate. The advantage is the short time spent on finding out the data placement paths in practice.

Operations

Figure 5A:
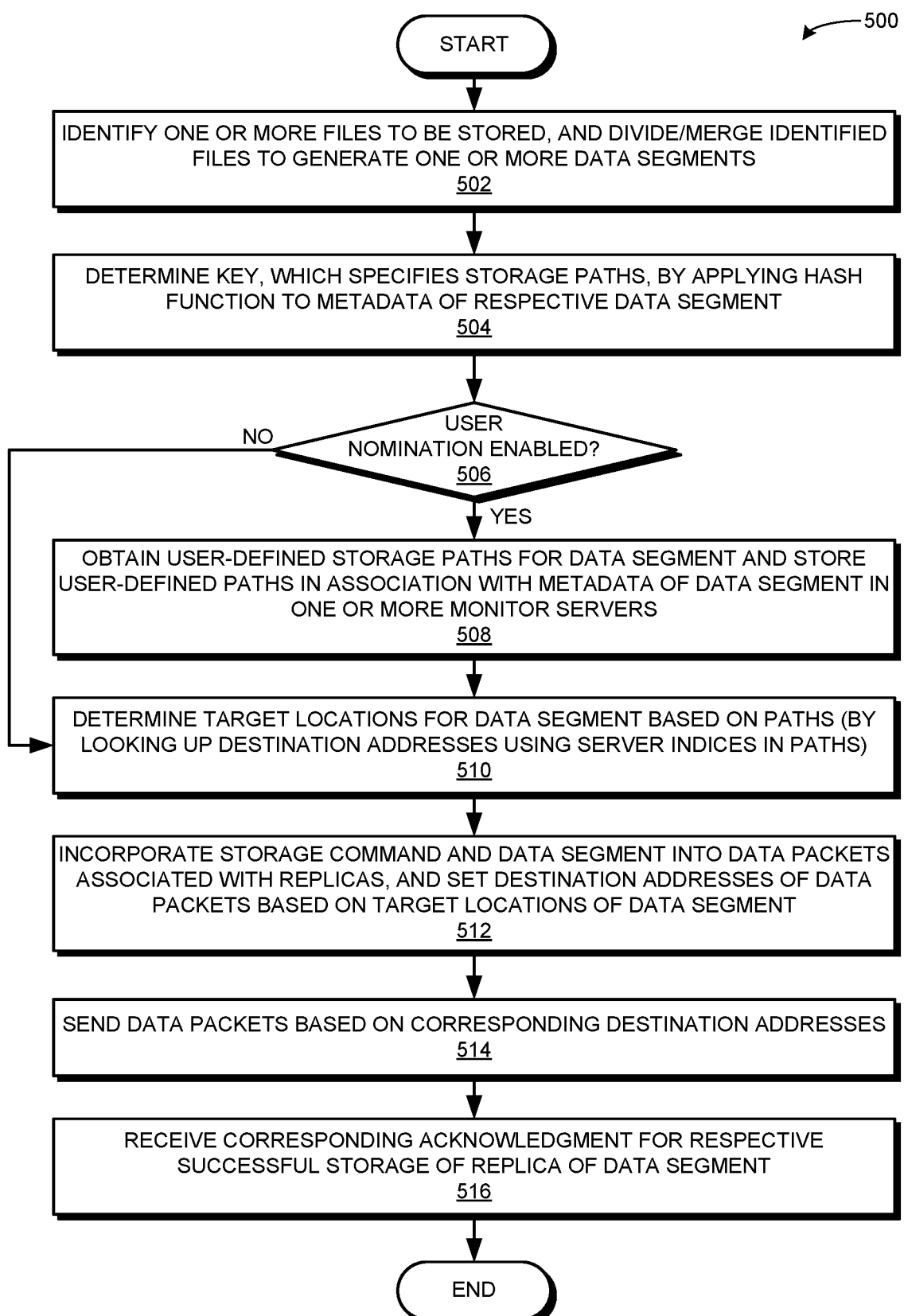
FIG. 5A presents a flowchart illustrating a method of a client server storing data in a lightweight distributed storage system, in accordance with an embodiment of the present application.

FIG. 5A presents a flowchart 500 illustrating a method of a client server storing data in a lightweight distributed storage system, in accordance with an embodiment of the present application. During operation, the client server identifies one or more files to be stored, and divides/merges the identified files to generate one or more data segments (operation 502). The client server determines a key, which specifies storage paths, by applying a hash function to the metadata of a respective data segment (operation 504). The client server then checks whether user nomination has been enabled for the data segment (operation 506). If user nomination has been enabled, the client server obtains user-defined storage paths for the data segment and stores the user-defined paths in association with the metadata of the data segment in one or more monitor servers (operation 508).

If user nomination has not been enabled (operation 506), or user-defined storage paths have been obtained and stored (operation 508), the client server determines the target locations for the data segment based on the paths (operation 510). In some embodiments, the client server can determine the target locations by looking up destination addresses using the server indices in the paths. The client server then incorporates a storage command (e.g., an RDMA write command) and the data segments into data packets associated with the replicas of the data segment, and sets the destination addresses of the data packets based on the target locations of the data segment (operation 512).

The client server sends the data packets based on the corresponding destination addresses (operation 514) and receives corresponding acknowledgment for a respective successful storage of a replica of the data segment (operation 516). It should be noted that the system writes each replica of the data segment in parallel to avoid the sequential operations to reduce latency. The client server determines that the data segment is securely stored after each replica is successfully stored in the storage server. In other words, when the client server receives the acknowledgment for all replicas, the client server determines that the write operation is completed.

Figure 5B:
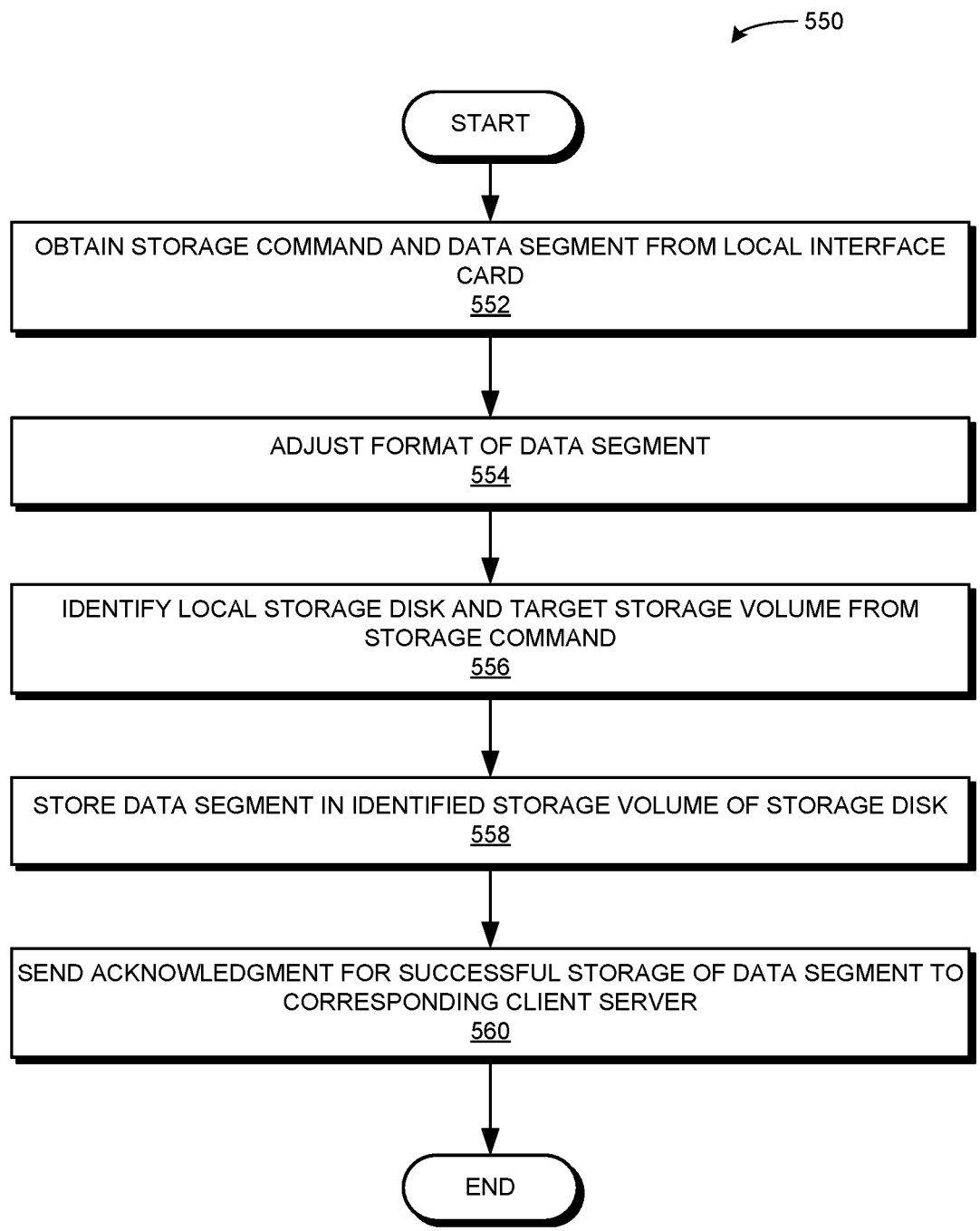
FIG. 5B presents a flowchart illustrating a method of a storage controller facilitating data storage in a lightweight distributed storage system, in accordance with an embodiment of the present application.

FIG. 5B presents a flowchart illustrating a method of a storage controller facilitating data storage in a lightweight distributed storage system, in accordance with an embodiment of the present application. During operation, the controller obtains a storage command and a data segment (e.g., in a buffer) from the local interface card (operation 552), and adjusts the format of the data segment (operation 554). The controller identifies a local disk and a target storage volume from the storage command (operation 556). The controller then stores the data segment in the identified storage volume of the storage disk (operation 558) and sends an acknowledgment for successful storage of the data segment to a corresponding client server (operation 560).

Figure 6A:
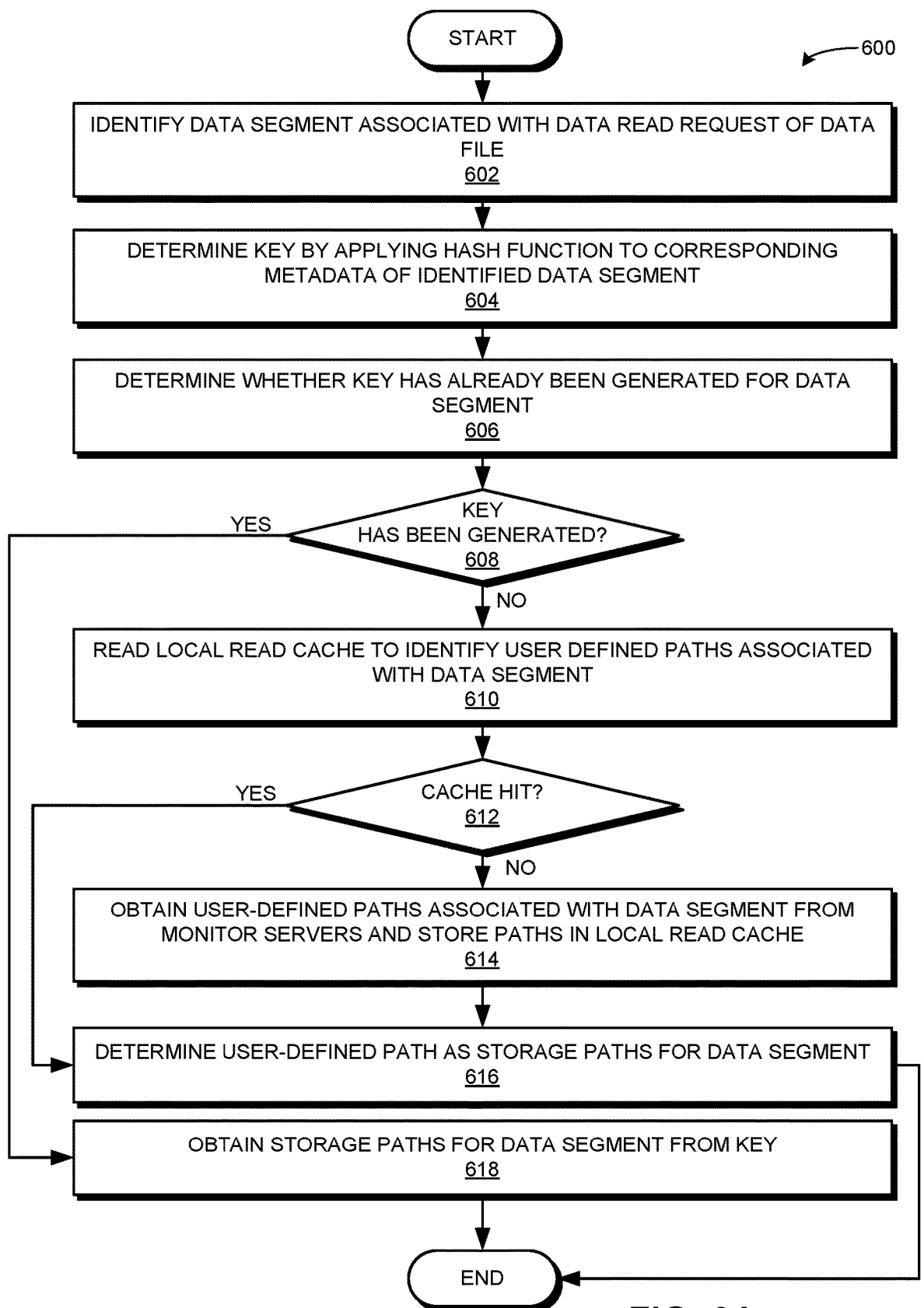
FIG. 6A presents a flowchart illustrating a method of a client server obtaining a storage path for retrieving data in a lightweight distributed storage system, in accordance with an embodiment of the present application.

FIG. 6A presents a flowchart illustrating a method of a client server obtaining a storage path for retrieving data in a lightweight distributed storage system, in accordance with an embodiment of the present application. During operation, the client server identifies a data segment associated with a data read request of a data file (operation 602) and determines a key by applying a hash function to the corresponding metadata of the identified data segment (operation 604). The client server then determines whether the key has already been generated for the data segment (operation 606). In some embodiments, the key is checked using a bloom filter. If the filter determines that the key is not in the hash key library, the key has not been generated yet.

If the key has not been generated (operation 608), the storage paths for the data segment can be user-defined. The client server then reads a local read cache to identify user-defined paths associated with the data segment (operation 610) and checks for a cache hit (operation 612). If there isn't a cache hit (i.e., a cache miss), the client server obtains the user-defined paths associated with the data segment from the monitor servers (e.g., using metadata of the data segment) and stores the paths in the local read cache (operation 614). If there is a cache hit (operation 612) or the user-defined paths are obtained (operation 614), the client server determines the user-defined paths as the storage paths for the data segment (operation 616). On the other hand, if the key has been generated (operation 608), the client server obtains the storage paths for the data segment from the key (operation 618).

Figure 6B:
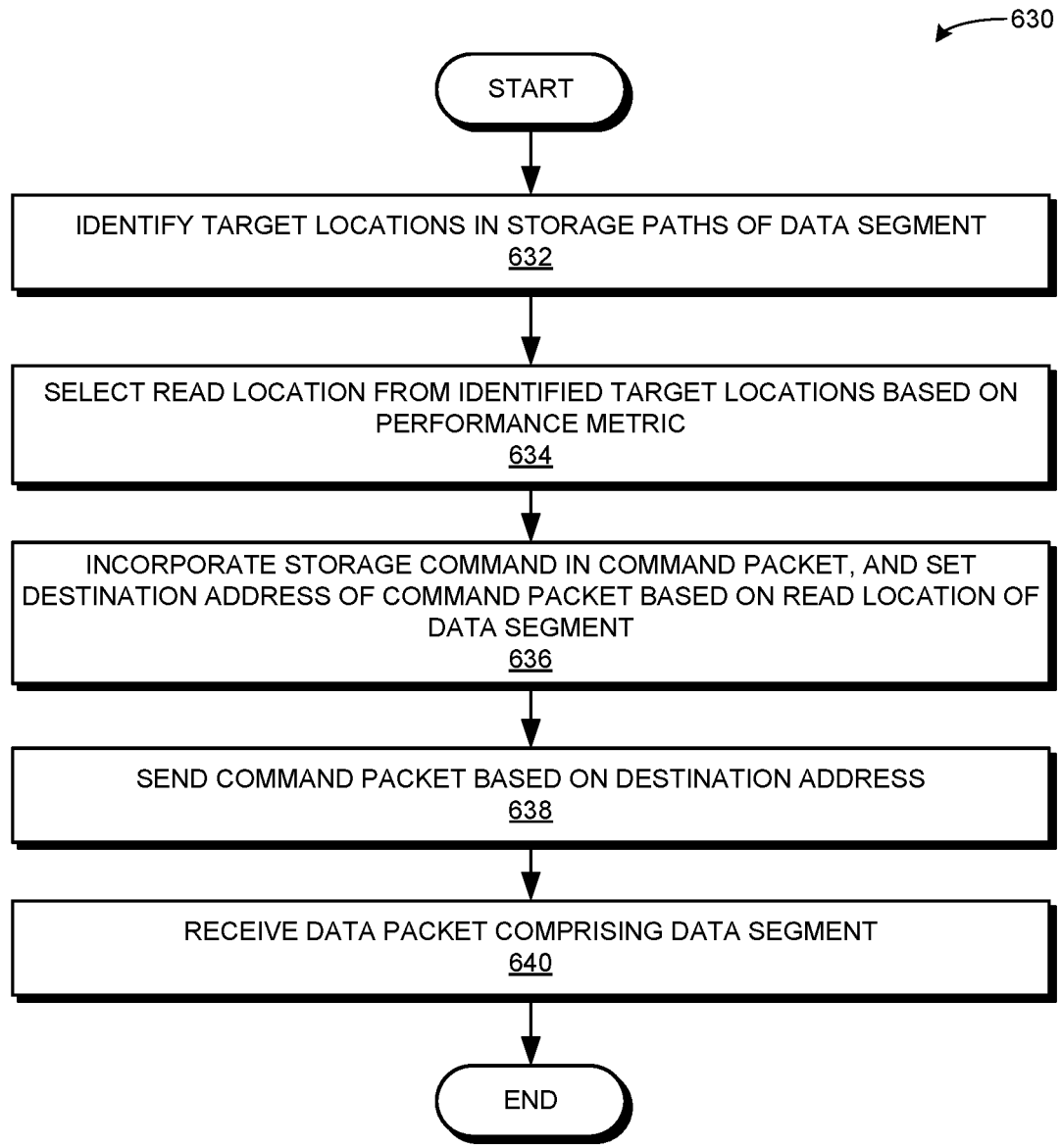
FIG. 6B presents a flowchart illustrating a method of a client server retrieving data using a storage path in a lightweight distributed storage system, in accordance with an embodiment of the present application.

FIG. 6B presents a flowchart illustrating a method of a client server retrieving data using a storage path in a lightweight distributed storage system, in accordance with an embodiment of the present application. The client server identifies the target locations in the storage paths of a data segment (operation 632) and selects a read location from the identified target locations based on a preference metric (operation 634). The preference metric can be based on one or more of: disk and/or server load, disk response time, and network latency. The client server incorporates a storage command (e.g., a read command) into a command packet, and sets the destination address of the command packet based on the read location of the data segment (operation 636). The client server then sends the command packet based on the destination address (operation 638) and receives a data packet comprising the data segment (operation 640).

Figure 6C:
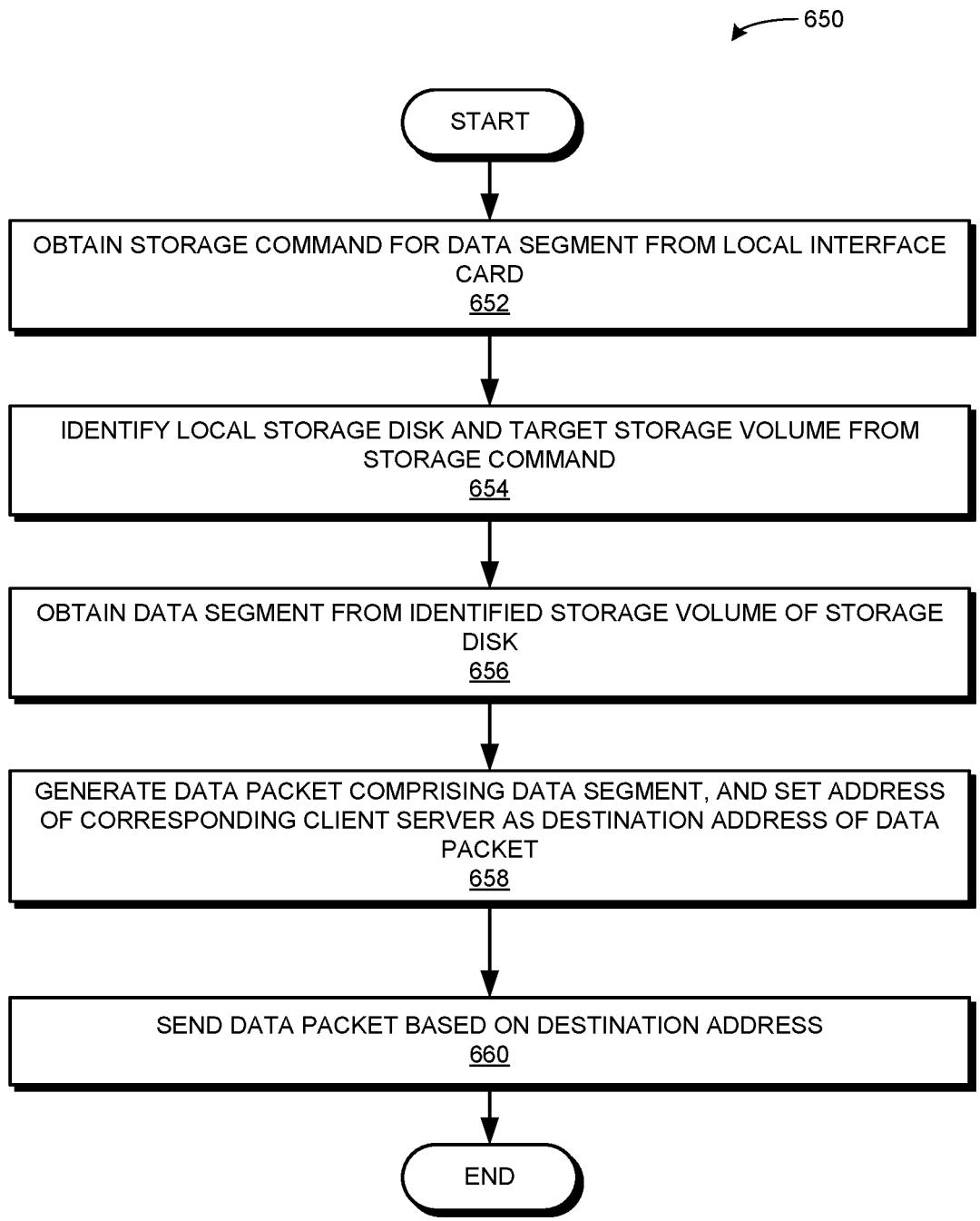
FIG. 6C presents a flowchart illustrating a method of a storage controller facilitating data retrieval in a lightweight distributed storage system, in accordance with an embodiment of the present application.

FIG. 6C presents a flowchart illustrating a method of a storage controller facilitating data retrieval in a lightweight distributed storage system, in accordance with an embodiment of the present application. During operation, the controller obtains a storage command (e.g., a read command) for a data segment from a local interface card (operation 652). The controller identifies the local storage disk and the target storage volume from the storage command (operation 654). The controller obtains the data segment from the identified storage volume of the storage disk (operation 656). The controller then generates a data packet comprising the data segment, and sets the address of the corresponding client server as the destination address of the data packet (operation 658) and sends the data packet based on the destination address (operation 660).

Exemplary Computer System and Apparatus

Figure 7:
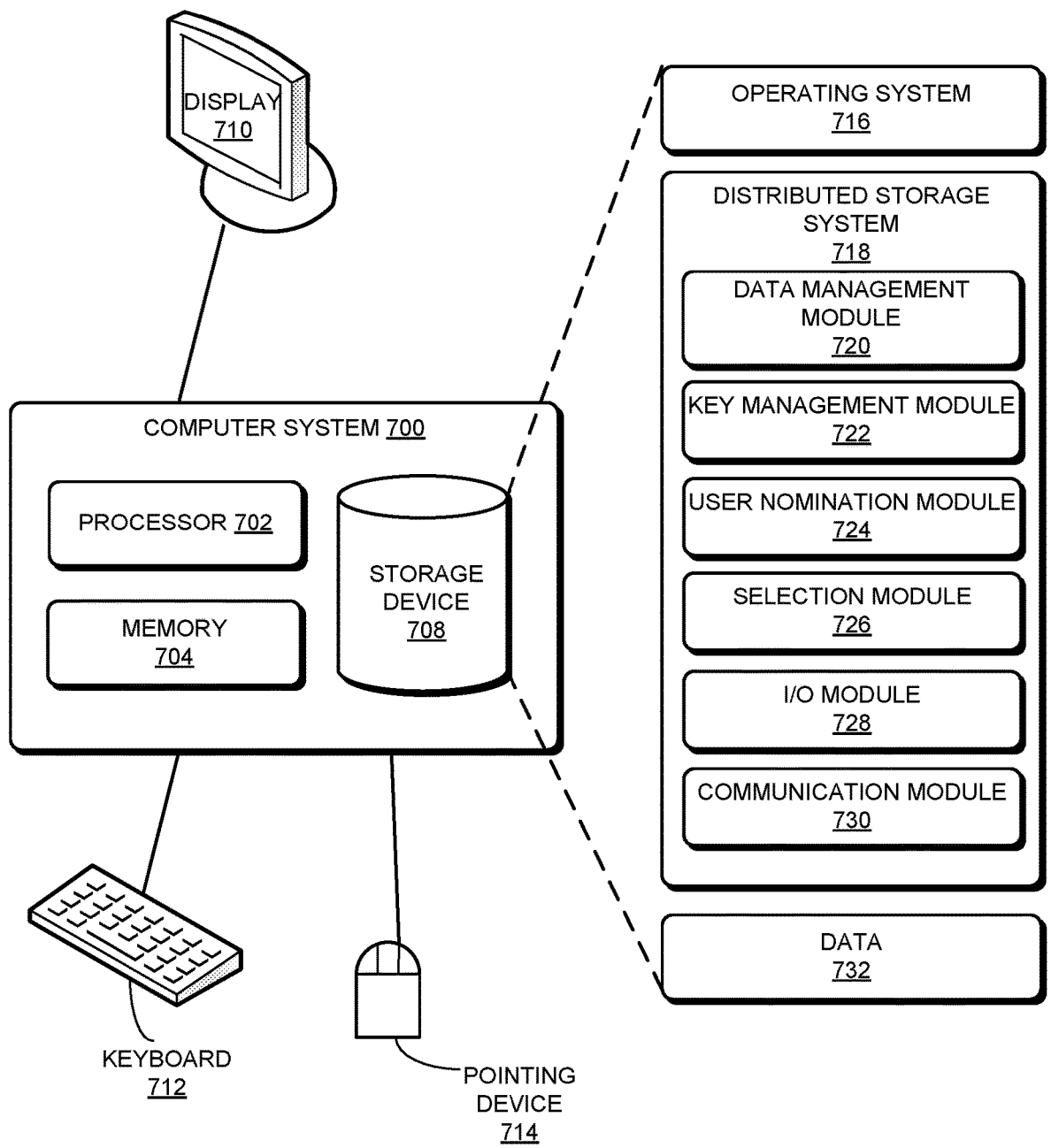
FIG. 7 illustrates an exemplary computer system that facilitates a low-latency lightweight distributed storage system, in accordance with an embodiment of the present application.

FIG. 7 illustrates an exemplary computer system that facilitates a low-latency lightweight distributed storage system, in accordance with an embodiment of the present application. Computer system 700 includes a processor 702, a memory 704, and a storage device 708. Computer system 700 may be a client-serving machine. Memory 704 can include a volatile memory (e.g., DIMM) that serves as a managed memory, and can be used to store one or more memory pools. Furthermore, computer system 700 can be coupled to a display device 710, a keyboard 712, and a pointing device 714. Storage device 708 can store an operating system 716, a distributed storage system 718, and data 732.

Distributed storage system 718 can include instructions, which when executed by computer system 700, can cause computer system 700 to perform methods and/or processes described in this disclosure. Specifically, distributed storage system 718 can include instructions for generating data segments, which can include splitting/merging data files (data management module 720). Distributed storage system 718 can also include instructions for generating a storage key (e.g., using a hash key) for a respective data segment (key management module 722). The storage key can include storage paths for the replicas of the data segment.

Furthermore, distributed storage system 718 includes instructions for allowing a user to enable user nomination for a data segment and define storage paths for the data segment (user nomination module 724). Distributed storage system 718 can also include instructions for storing user-defined paths in monitoring servers (user nomination module 724). Distributed storage system 718 can further include instructions for selecting whether to use a storage key or user-defined paths for determining a storage path for a data segment (e.g., for both read and write operations) (selection module 726). Distributed storage system 718 can also include instructions for obtaining user-defined paths from monitoring servers (selection module 726).

Distributed storage system 718 can further include instructions for user-space communication and issuing RDMA-based read and write operations (I/O module 728). Distributed storage system 718 can also include instructions for sending and receiving command packets and data packets comprising RDMA commands and data segments (communication module 730). Distributed storage system 718 can further include instructions for sending and receiving acknowledgment of a successful read/write command (communication module 730).

Data 732 can include any data that is required as input or that is generated as output by the methods and/or processes described in this disclosure. Specifically, data 732 can store at least: the storage keys, metadata of a respective data segment, a mapping between server indices and server addresses, and a mapping between metadata and user-defined paths.

Figure 8:
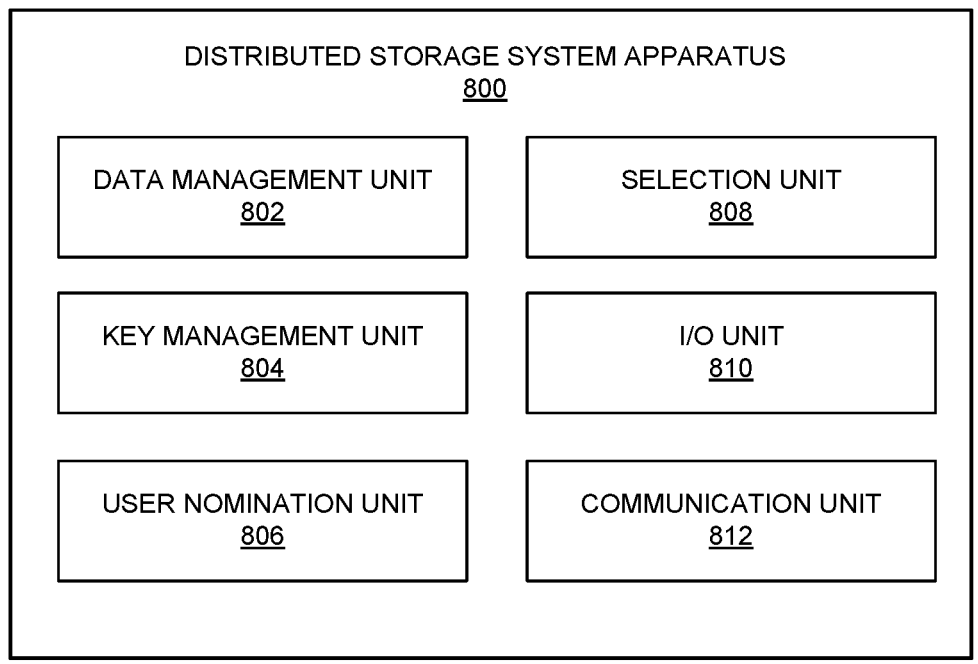
FIG. 8 illustrates an exemplary apparatus that facilitates a low-latency lightweight distributed storage system, in accordance with an embodiment of the present application.

FIG. 8 illustrates an exemplary apparatus that facilitates a low-latency lightweight distributed storage system, in accordance with an embodiment of the present application. Apparatus 800 can comprise a plurality of units or apparatuses which may communicate with one another via a wired, wireless, quantum light, or electrical communication channel. Apparatus 800 may be realized using one or more integrated circuits, and may include fewer or more units or apparatuses than those shown in FIG. 8. Further, apparatus 800 may be integrated in a computer system, or realized as a separate device, which is capable of communicating with other computer systems and/or devices. Specifically, apparatus 800 can comprise units 802-812, which perform functions or operations similar to modules 720-730 of computer system 700 of FIG. 7, including: a data management unit 802; a key management unit 804; a user nomination unit 806; a selection unit 808; an I/O unit 810; and a communication unit 812.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing embodiments described herein have been presented for purposes of illustration and description only. They are not intended to be exhaustive or to limit the embodiments described herein to the forms disclosed. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A computer-implemented method for facilitating a distributed storage system, the method comprising:
generating a data segment from a data file associated with a write operation;
determining whether a user-defined storage path is specified for the data segment;
in response to determining that a user-defined storage path is not specified for the data segment, determining a storage key for the data segment, wherein the storage key corresponds to a storage path that indicates a target storage location of a replica of the data segment;
in response to determining that a user-defined storage path is specified for the data segment, obtaining the storage path from a local read cache, or in response to a cache miss, from a monitor server of the distributed storage system based on metadata of the data segment; and
generating a data packet comprising the data segment, wherein a destination for the data packet corresponds to a target disk specified by the storage path.

2. The method of claim 1, wherein generating the data segment from the data file comprises one of:
merging the data file with a second data file;
splitting the data file and generating a second data segment from a part of the data file; and
incorporating the data file into the data segment in its entirety.

3. The method of claim 1, wherein the data packet is a remote direct memory access (RDMA) packet that allows a write operation on the target disk without requiring processing from a central processing unit (CPU) at a storage server hosting the target disk.

4. The method of claim 1, further comprising determining the storage key for the data segment by applying a hash function to the metadata of the data segment; and
wherein the storage key comprises one or more of:
a first key segment corresponding to a storage server hosting the target disk;
a second key segment corresponding to the target disk; and
a third key segment corresponding to a volume of the target disk.

5. The method of claim 1, wherein, in response to determining that a user-defined storage path is specified for the data segment, the method further comprises:
storing a mapping between the user-defined storage path and the metadata in the monitor server of the distributed storage system, wherein the monitor server is configured to verify data consistency for the distributed storage system.

6. The method of claim 1, wherein determining whether the user-defined storage path is specified for the data segment further comprises checking an indicator indicating whether the user-defined storage path is specified by a user for the data segment.

7. The method of claim 1, wherein a plurality of replicas of the data segment are stored in a plurality of target disks, and wherein a respective target disk is specified by a corresponding storage path indicated by the storage key.

8. The method of claim 1, wherein, in response to determining a read operation associated with the data file, the method further comprises:
generating the storage key for the data segment by applying a hash function to the metadata of the data segment; and
in response to determining that a user-defined storage path is not specified for the data segment, generating a command packet comprising an instruction for retrieving the data segment, wherein a destination of the data packet corresponds to the target disk specified by the storage path in the storage key.

9. The method of claim 1, wherein determining whether a user-defined storage path is specified for the data segment comprises applying a bloom filter to determine whether the storage key has been generated.

10. The method of claim 1,
wherein the monitor server maintains a mapping between the user-defined storage path and the metadata, and wherein the monitor server is configured to verify data consistency for the distributed storage system.

11. A computer system for facilitating a distributed storage system, the system comprising:
a processor; and a memory coupled to the processor and storing instructions, which when executed by the processor cause the processor to perform a method, the method comprising:

generating a data segment from a data file associated with a write operation;

determining whether a user-defined storage path is specified for the data segment;

in response to determining that a user-defined storage path is not specified for the data segment, determining a storage key for the data segment, wherein the storage key corresponds to a storage path that indicates a target storage location of a respective replica of the data segment;

in response to determining that a user-defined storage path is specified for the data segment, obtaining the storage path from a local read cache, or in response to a cache miss, from a monitor server of the distributed storage system based on metadata of the data segment; and generating a data packet comprising the data segment, wherein a destination for the data packet corresponds to a target disk specified by the storage path.

12. The computer system of claim 11, wherein generating the data segment from the data file comprises one of:
merging the data file with a second data file;
splitting the data file and generating a second data segment from part of the data file; and
incorporating the data file into the data segment in its entirety.

13. The computer system of claim 11, wherein the data packet is a remote direct memory access (RDMA) packet that allows a write operation on the target disk without requiring processing from a central processing unit (CPU) at a storage server hosting the target disk.

14. The computer system of claim 11, wherein the method further comprises determining the storage key for the data segment by applying a hash function to the metadata of the data segment; and
wherein the storage key comprises one or more of:
a first key segment corresponding to a storage server hosting the target disk;
a second key segment corresponding to the target disk; and
a third key segment corresponding to a volume of the target disk.

15. The computer system of claim 11, wherein, in response to determining that a user-defined storage path is specified for the data segment, the method further comprises:
storing a mapping between the user-defined storage path and the metadata in the monitor server of the distributed storage system, wherein the monitor server is configured to verify data consistency for the distributed storage system.

16. The computer system of claim 11, wherein determining whether the user-defined storage path is specified for the data segment comprises checking an indicator indicating whether the user-defined storage path is specified by a user for the data segment.

17. The computer system of claim 11, wherein a plurality of replicas of the data segment are stored in a plurality of target disks, and wherein a respective target disk is specified by a corresponding storage path indicated by the storage key.

18. The computer system of claim 11, wherein, in response to determining a read operation associated with the data file, the method further comprises:
generating the storage key for the data segment by applying a hash function to the metadata of the data segment; and
in response to determining that a user-defined storage path is not specified for the data segment, generating a command packet comprising an instruction for retrieving the data segment, wherein a destination of the data packet corresponds to the target disk specified by the storage path in the storage key.

19. The computer system of claim 11, wherein determining whether a user-defined storage path is specified for the data segment comprises applying a bloom filter to determine whether the storage key has been generated.

20. The computer system of claim 11,
wherein the monitor server maintains a mapping between the user-defined storage path and the metadata, and wherein the monitor server is configured to verify data consistency for the distributed storage system.

* * * * *